(12) United States Patent
Negrete Hernandez

(10) Patent No.: US 11,515,078 B2
(45) Date of Patent: Nov. 29, 2022

(54) HARMONICS FILTERS USING SEMI NON-MAGNETIC BOBBINS

(71) Applicant: Joaquín Enríque Negrete Hernandez, Mexico City (MX)

(72) Inventor: Joaquín Enríque Negrete Hernandez, Mexico City (MX)

( * ) Notice: Subject to any disclaimer, the term of this patent is extended or adjusted under 35 U.S.C. 154(b) by 0 days.

(21) Appl. No.: 15/386,797

(22) Filed: Dec. 21, 2016

(65) Prior Publication Data

US 2018/0174743 A1    Jun. 21, 2018

(51) Int. Cl.
| | | |
|---|---|---|
| H01F 27/32 | (2006.01) | |
| H01F 5/02 | (2006.01) | |
| H05B 6/44 | (2006.01) | |
| H05B 6/06 | (2006.01) | |

(52) U.S. Cl.
CPC ............ *H01F 27/325* (2013.01); *H01F 5/02* (2013.01); *H05B 6/06* (2013.01); *H05B 6/44* (2013.01)

(58) Field of Classification Search
CPC .......... H01F 27/325; H01F 5/02; H05B 6/36; H05B 6/04; H05B 6/06; H05B 6/44
USPC ........................................................ 219/674
See application file for complete search history.

(56) References Cited

U.S. PATENT DOCUMENTS

| | | | |
|---|---|---|---|
| 1,481,190 A | | 5/1921 | Durbin et al. |
| 3,028,566 A | | 4/1962 | Camilli |
| 3,225,319 A | * | 12/1965 | Trench .................. H01F 37/005 336/180 |
| 3,555,291 A | * | 1/1971 | Dewey ....................... H02J 3/01 307/105 |
| 3,710,284 A | * | 1/1973 | Uhlmann ............. H03H 7/1725 333/170 |
| 4,228,492 A | * | 10/1980 | Hausler ..................... H02J 3/01 333/176 |

(Continued)

FOREIGN PATENT DOCUMENTS

| | | |
|---|---|---|
| CA | 2 727 972 A1 | 7/2012 |
| CN | 106531424 A | 3/2017 |

(Continued)

OTHER PUBLICATIONS

International Search Report dated Sep. 14, 2018 from corresponding International (PCT) Patent Application No. PCT/IB2017/001781, 3 pages.

(Continued)

*Primary Examiner* — Eric S Stapleton
(74) *Attorney, Agent, or Firm* — Ruggiero McAllister & McMahon LLC

(57) ABSTRACT

Disclosed are semi non-magnetic bobbins for use in core reactors, and core reactors that include the semi non-magnetic bobbins. The semi non-magnetic bobbins are made of a non-metallic material and provide core reactors that can withstand high temperatures and at the same time avoid eddy current effects. The disclosed semi non-metallically permeable bobbins also do not adversely affect electrical power quality and save power and can be used to capture harmonics currents. When properly designed and arranged can be used to provide electromagnetic induction heaters using harmonics currents imported from an electrical power system as the working source of heat and provide a zero-cost heating process.

3 Claims, 28 Drawing Sheets

(56) References Cited

U.S. PATENT DOCUMENTS

| | | | | |
|---|---|---|---|---|
| 4,812,669 A * | 3/1989 | Takeda | H02J 3/01 | 307/105 |
| 5,202,584 A * | 4/1993 | Burke | H01F 27/085 | 307/105 |
| 5,253,261 A | 10/1993 | Chaffee | | |
| 5,444,609 A * | 8/1995 | Swamy | H02J 3/01 | 363/47 |
| 5,529,703 A * | 6/1996 | Sprenger | B03C 1/253 | 219/604 |
| 5,585,772 A * | 12/1996 | Joshi | H01L 41/12 | 310/26 |
| 5,914,540 A * | 6/1999 | Larsen | H01F 27/34 | 307/105 |
| 6,009,004 A * | 12/1999 | Swamy | H02J 3/01 | 333/175 |
| 6,060,975 A | 5/2000 | Rowe | | |
| 6,255,632 B1 * | 7/2001 | Yokoyama | G03G 15/2053 | 219/619 |
| 6,274,939 B1 * | 8/2001 | Wolf | H01F 1/113 | 257/789 |
| 6,844,794 B2 * | 1/2005 | Lauri | H02J 3/01 | 333/12 |
| 7,309,973 B2 * | 12/2007 | Garza | H02P 27/16 | 318/438 |
| 7,535,125 B2 * | 5/2009 | Shudarek | H03H 7/427 | 307/105 |
| 7,602,136 B2 * | 10/2009 | Garza | H02P 25/16 | 318/438 |
| 7,902,788 B2 * | 3/2011 | Garza | H02P 25/16 | 318/438 |
| 8,115,571 B2 * | 2/2012 | Pietkiewicz | H02J 3/01 | 333/167 |
| 8,212,416 B2 * | 7/2012 | Navid | H01F 17/04 | 307/105 |
| 8,564,240 B2 * | 10/2013 | Garza | H02P 25/16 | 318/438 |
| 8,610,311 B1 | 12/2013 | Grimes | | |
| 8,680,961 B2 * | 3/2014 | Yokota | H01F 27/022 | 336/212 |
| 8,816,808 B2 | 8/2014 | MacLennan et al. | | |
| 2004/0238531 A1 * | 12/2004 | Kikuchi | G03G 15/2014 | 219/674 |
| 2005/0174816 A1 * | 8/2005 | Nishikawa | H01F 5/02 | 363/83 |
| 2006/0209582 A1 * | 9/2006 | Tsuruya | H01F 38/08 | 363/125 |
| 2007/0247104 A1 * | 10/2007 | Garza | H02P 27/16 | 318/807 |
| 2008/0011336 A1 | 1/2008 | Hamaguchi | | |
| 2008/0094021 A1 * | 4/2008 | Garza | H02P 27/16 | 318/729 |
| 2009/0144967 A1 * | 6/2009 | Hasu | H01F 27/2847 | 29/605 |
| 2010/0026232 A1 * | 2/2010 | Garza | H02P 27/16 | 318/812 |
| 2010/0156584 A1 * | 6/2010 | Yamaguchi | H01F 27/306 | 336/65 |
| 2011/0121775 A1 * | 5/2011 | Garza | H02P 27/16 | 318/812 |
| 2012/0225784 A1 * | 9/2012 | Piascik | H01F 5/06 | 505/150 |
| 2012/0257419 A1 * | 10/2012 | Kaneko | H01F 27/306 | 363/15 |
| 2012/0257420 A1 * | 10/2012 | Kaneko | H01F 27/2847 | 363/21.04 |
| 2012/0313728 A1 * | 12/2012 | Cairo, Jr. | H02J 3/01 | 333/174 |
| 2012/0319404 A1 * | 12/2012 | Joseph | H02J 7/328 | 290/50 |
| 2012/0319614 A1 * | 12/2012 | Lee | H01F 27/325 | 315/254 |
| 2013/0002390 A1 * | 1/2013 | Nam | H01F 27/324 | 336/207 |
| 2013/0180980 A1 * | 7/2013 | Parsche | H05B 6/36 | 219/672 |
| 2014/0111134 A1 * | 4/2014 | Garza | H02P 27/16 | 318/814 |
| 2014/0132378 A1 * | 5/2014 | Vafakhah | H01F 27/12 | 336/55 |
| 2015/0279550 A1 * | 10/2015 | Kitami | H01F 27/24 | 336/178 |
| 2015/0287522 A1 | 10/2015 | Piascik et al. | | |
| 2015/0318106 A1 * | 11/2015 | Pollock | H01F 27/022 | 336/61 |
| 2016/0053830 A1 * | 2/2016 | Mogi | F16D 27/112 | 192/84.9 |
| 2016/0118185 A1 * | 4/2016 | Hirata | H01F 27/325 | 336/198 |
| 2016/0148739 A1 * | 5/2016 | Suzuki | H01F 27/325 | 335/299 |
| 2016/0155591 A1 * | 6/2016 | Miura | H01F 27/325 | 335/202 |

FOREIGN PATENT DOCUMENTS

| | | |
|---|---|---|
| DE | 10 2013 105 120 A1 | 11/2014 |
| GB | 2 375 592 A | 11/2002 |
| JP | 49-29417 A | 6/1972 |
| JP | 52-135563 S | 11/1977 |
| JP | 58-97154 S | 7/1983 |
| JP | 58-97154 U | 7/1983 |
| JP | 59-104900 A | 6/1984 |
| JP | 4-361511 A | 12/1992 |
| JP | 8-203751 A | 8/1996 |
| JP | 2001-284034 A | 10/2001 |
| JP | 2002-170723 A | 6/2002 |
| WO | 2018/130872 A2 | 7/2018 |

OTHER PUBLICATIONS

Written Opinion dated Sep. 14, 2018 from corresponding International (PCT) Patent Application No. PCT/IB2017/001781, 5 pages.
International Preliminary Report on Patentability dated Jul. 4, 2019 from corresponding International Application No. PCT/IB2017/001781, 7 pages.
Taiwan Office Action dated Dec. 11, 2018 from corresponding Taiwanese patent application No. 106142840, 3 pages.
Patent Rejection Decision dated Oct. 28, 2019 from corresponding Taiwan Patent Application No. 106142840, 11 pages.
Canadian Office Action dated Sep. 16, 2020 from corresponding Canadian Patent Application No. 3,047,910, 4 pages.
Chile Second Office Action dated Sep. 14, 2020 from corresponding Chilean Patent Application No. 2019-01724, 28 pages.
Japanese Notification of Refusal dated Aug. 25, 2020 from corresponding Japanese Patent Application No. 2019-555079, 10 pages.
European Office Action dated Jul. 28, 2020 from corresponding European Patent Application No. 17891425.5, 11 pages.
Australian Examination Report dated Dec. 14, 2020 from corresponding Australian Application No. 2017393086, 4 pages.
Israeli Preliminary Office Action dated May 24, 2020 from corresponding Israeli Patent Application No. 267457, 5 pages.
Chile First Office Action dated Jun. 8, 2020 from corresponding Chile Patent Application No. 201901724, 26 pages.
Canadian Examiner's Report dated Jul. 8, 2021 from corresponding Canadian Patent Application No. 3,047,910, 4 pages.
Korean Notification of Reason for Refusal dated Jul. 17, 2021 from corresponding Korean Patent Application No. 10-2019-7020835, 15 pages.
Japanese Final Office Action dated May 25, 2021 from corresponding Japanese Patent Application No. 2019-555079, 20 pages.
Eurasian Office Action dated Mar. 22, 2021 from corresponding Eurasian Patent Application No. 201991211, 2 pages.
International Preliminary Report on Patentability dated Dec. 1, 2021 from corresponding International Patent Application No. PCT/IB2017/001781, 88 pages.

(56) References Cited

OTHER PUBLICATIONS

Chinese First Office Action dated May 7, 2022 from corresponding Chinese Patent Application No. 201780079096.7, 15 pages.

* cited by examiner

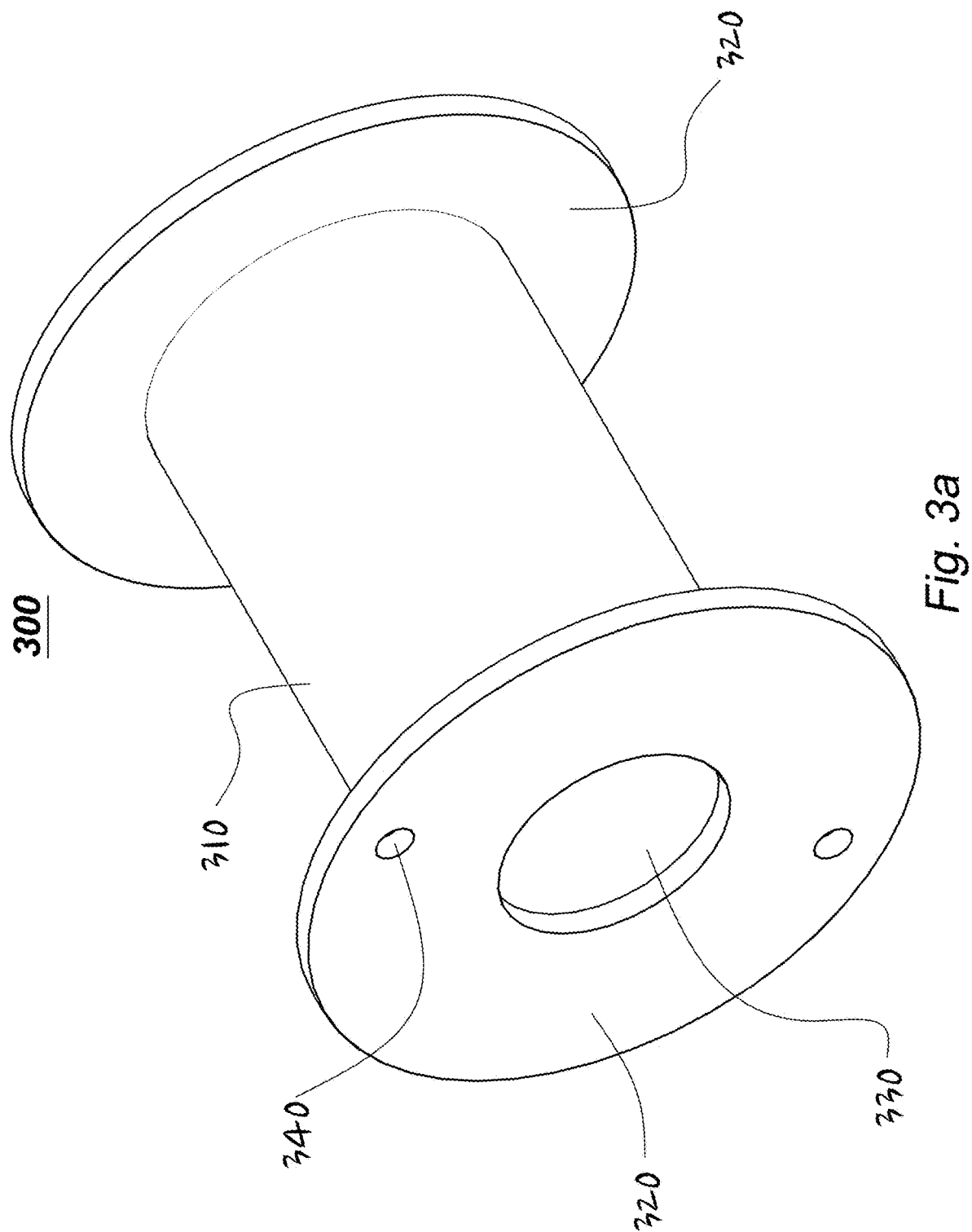

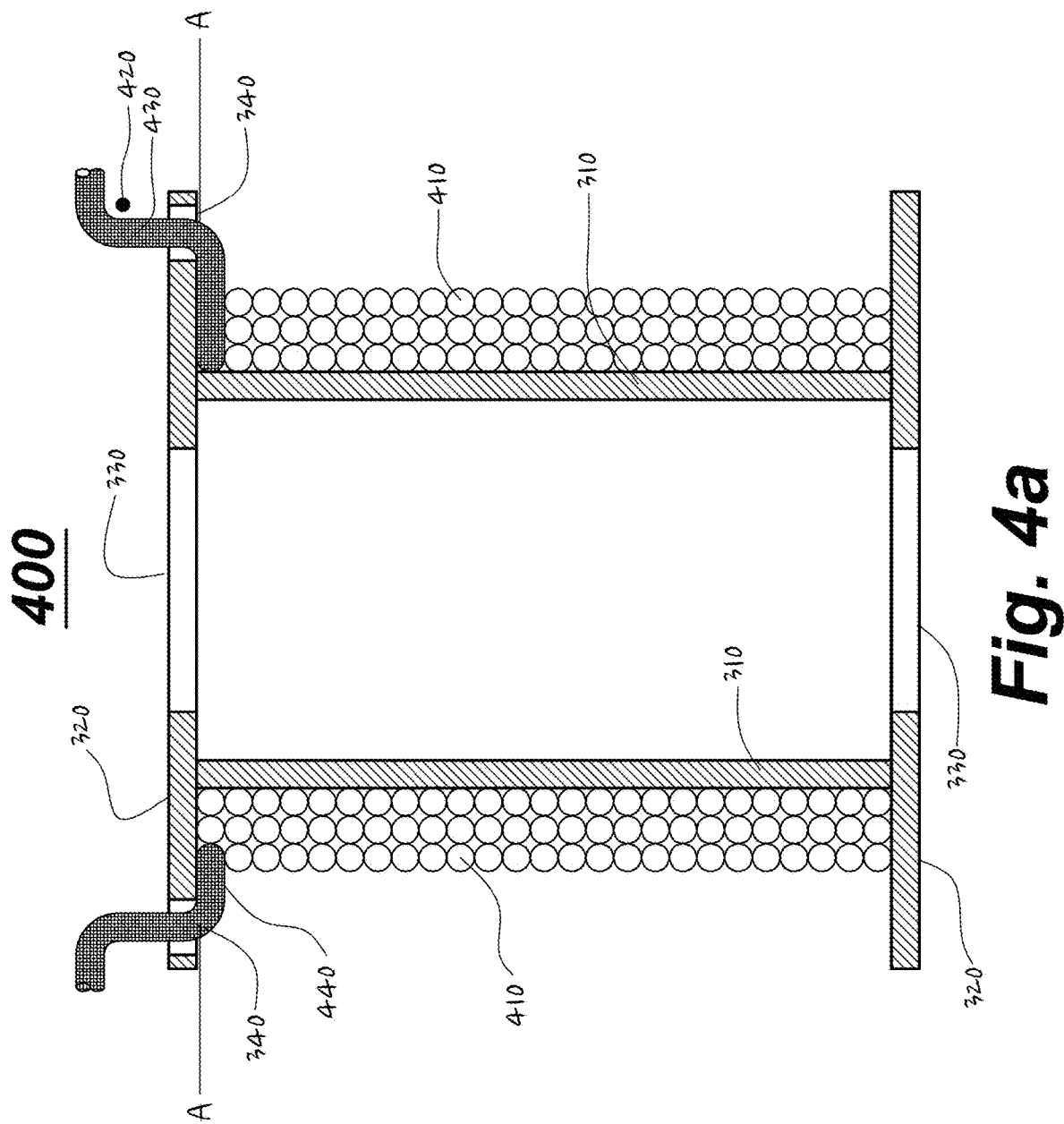

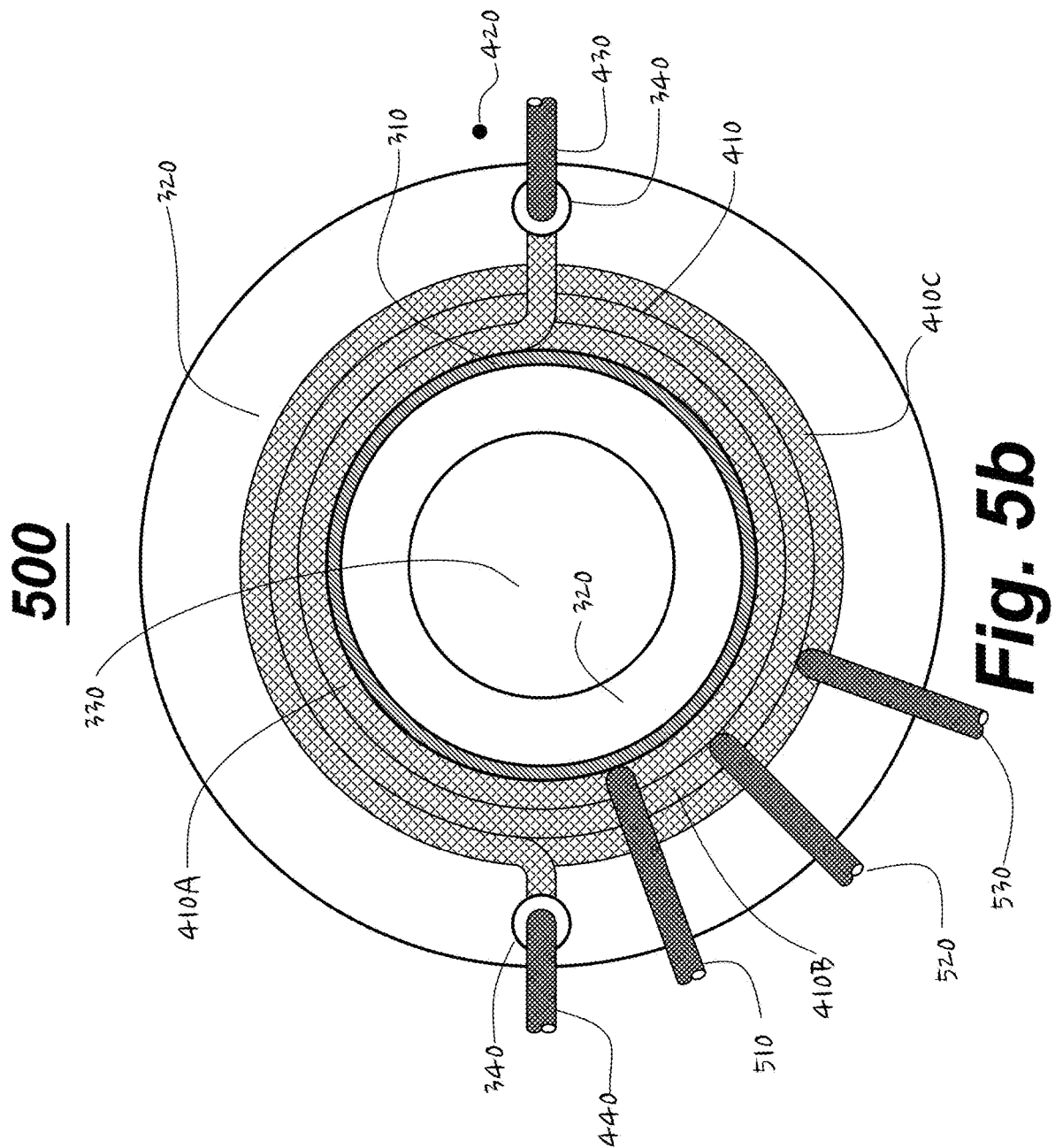

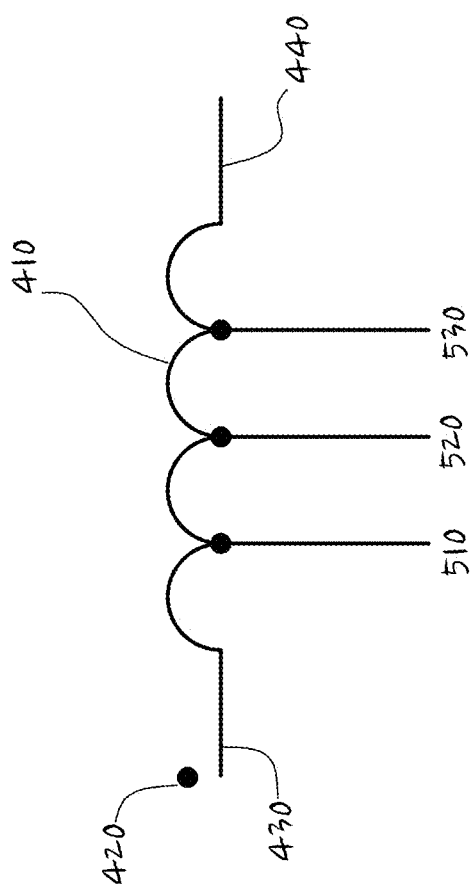

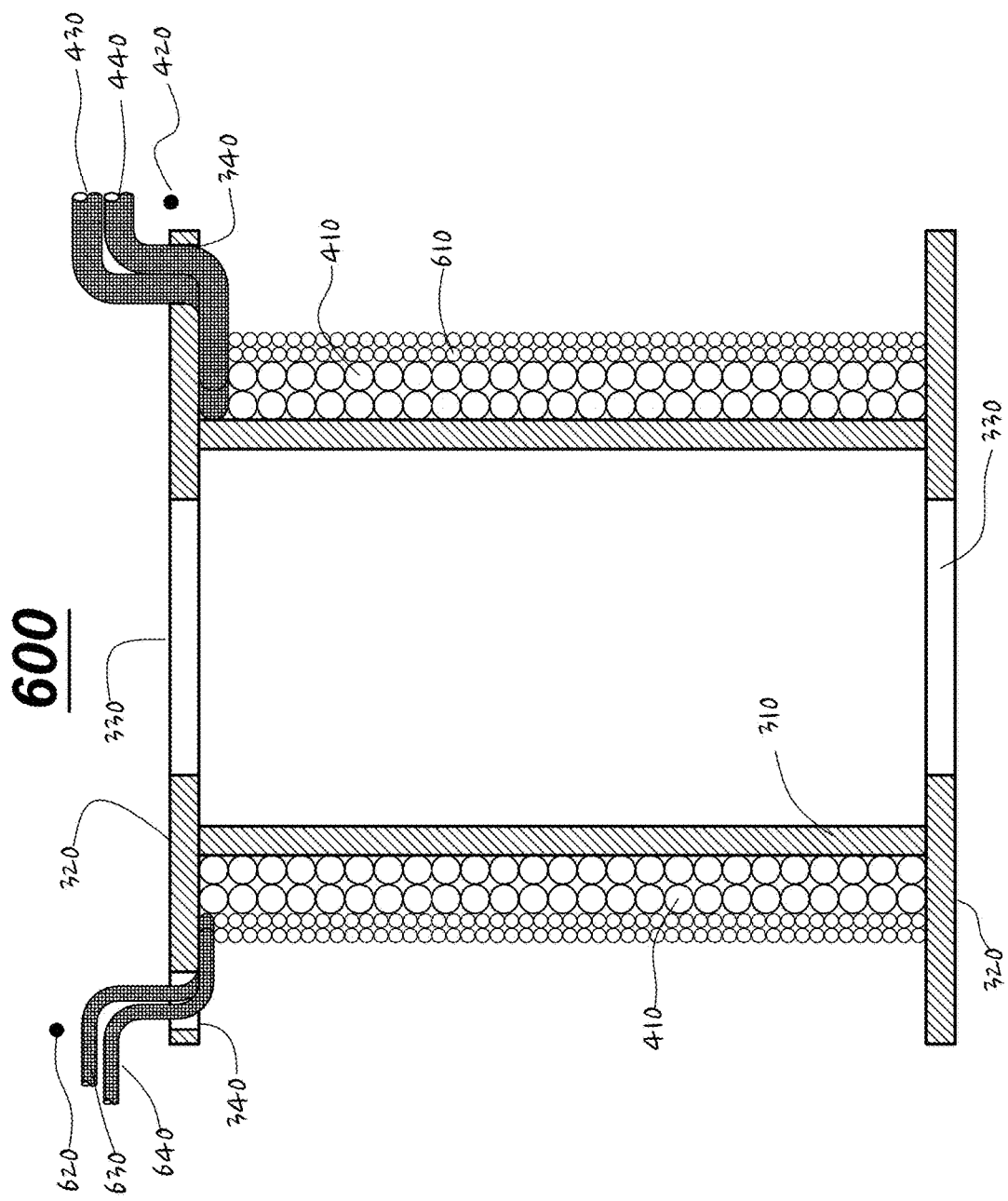

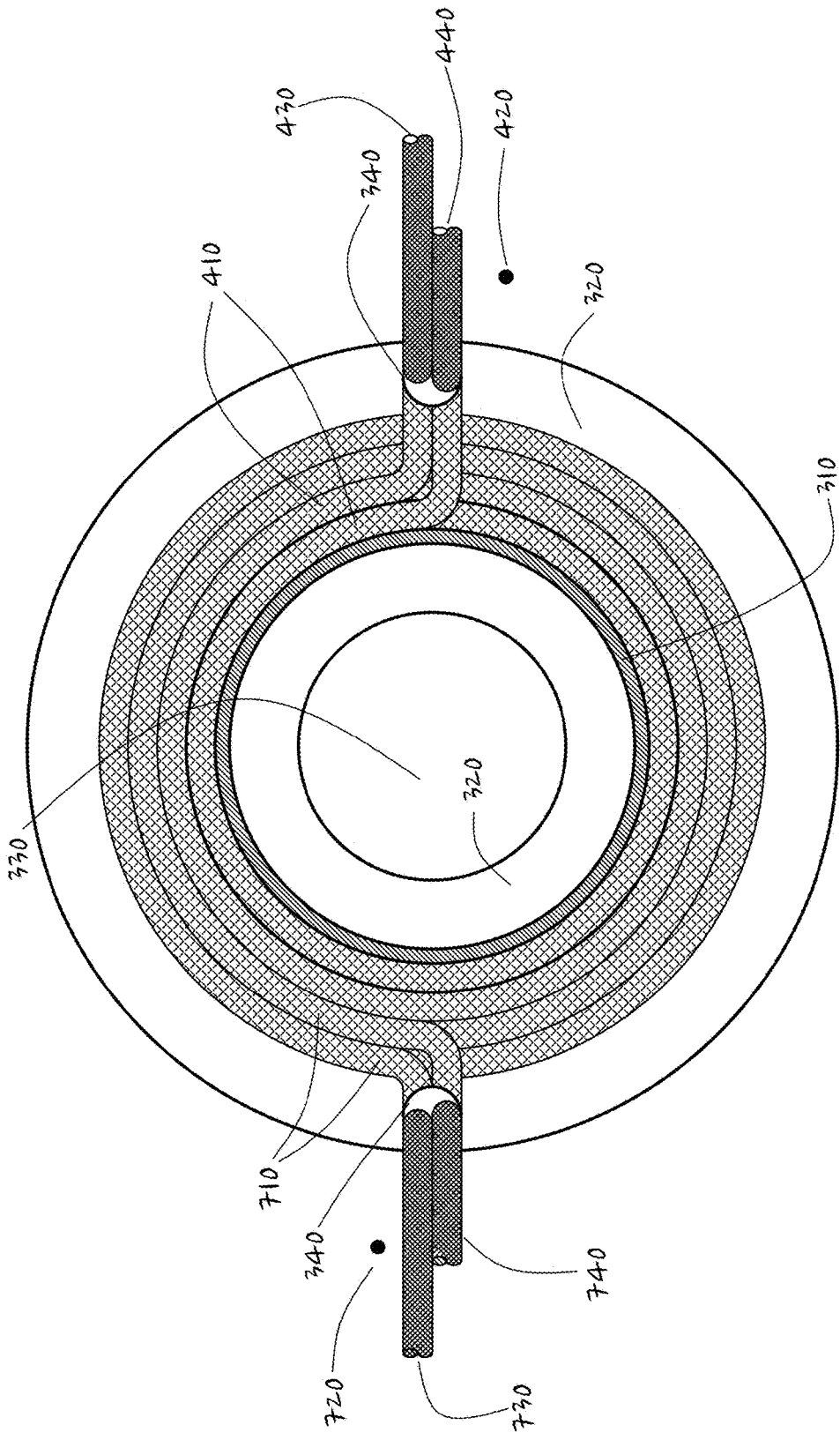

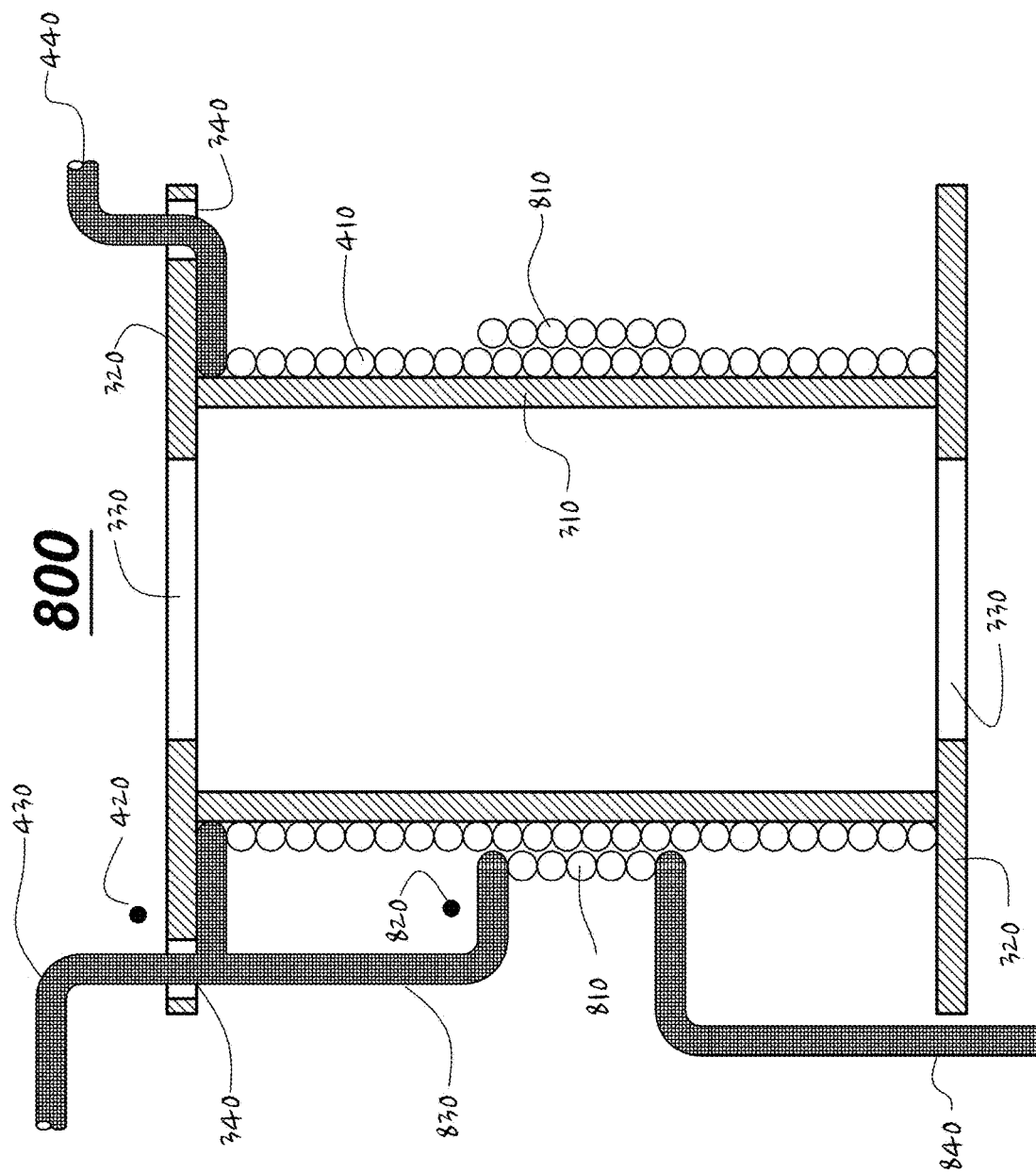

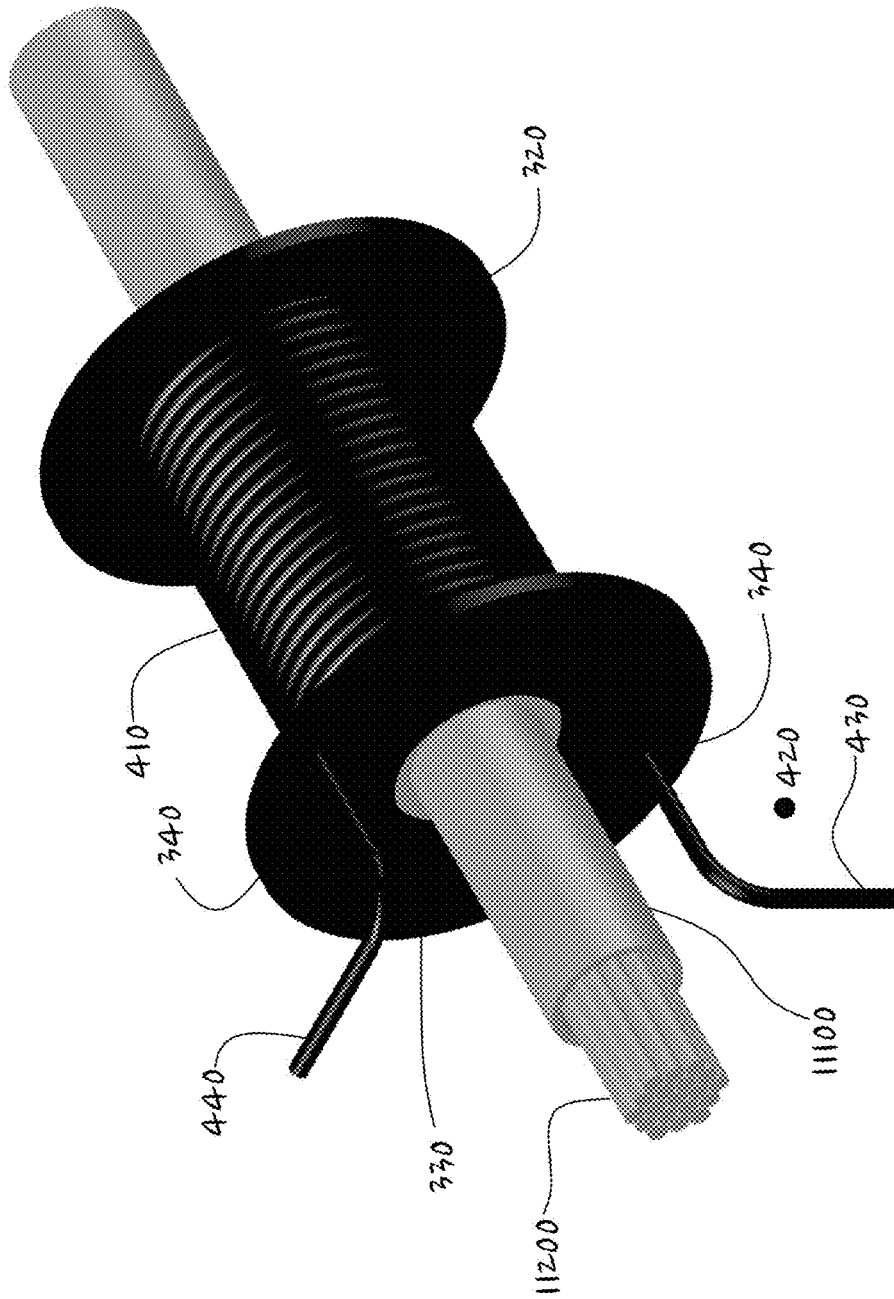

HARMONICS FILTERS USING SEMI NON-MAGNETIC BOBBINS

BACKGROUND OF THE DISCLOSURE

1. Field of the Disclosure

The present disclosure relates to semi non-magnetic bobbins for use in core reactors, and core reactors that include the semi non-magnetic bobbins. More particularly, the present disclosure relates to semi non-magnetic bobbins used in core reactors that can withstand high temperatures and at the same time avoid eddy current effects. These attributes result from the use of the semi non-metallically permeable bobbins that do not adversely affect electrical power quality and save power.

2. Description of the Related Art

Electrical distribution systems supply electricity to linear and non-linear loads. Non-linear loads produce current harmonics frequencies that saturate the power distribution system. Typical machines that produce current harmonics by way of example are electronic switch-mode power supplies, battery chargers, adjustable speed motor drives (ASD), power rectifiers, uninterruptible power supplies (UPS), high-efficiency fluorescent lighting having electronic ballasts and heating, ventilation and air conditioning (HVAC) systems, among others.

Current harmonics frequencies create many problems in the power distribution system including: increased current in the system, increased voltage total harmonic distortion level, reduced power factor, increased power losses, reduced reliability of the power distribution equipment and reduced electromagnetic compatibility between loads. Current harmonics frequencies also create problems in different electrical equipment, such as electric motors that suffer hysteresis losses mostly caused by eddy currents. These hysteresis losses result in an increased heating of the motor core that shortens the life of the motor, and results in added vibration and increased noise levels. Other problems created by and related to current harmonics frequencies are well-known to those skilled in the art.

The foregoing problems are well-recognized and are the bases for the division of responsibilities for harmonics control that are found in standards such as IEEE Standard 519-1992, Recommended Practices and Requirements for Harmonic Control in Electrical Power Systems. Specifically, the above standard recommends that: (1) Control over the amount of harmonics current injected into the system take place at the end-use application; and (2) Control over the voltage distortion be exercised by the entity having control over the system impedance, which is often the utility, assuming that the harmonics currents injection is within reasonable limits.

A number of systems, components therefor and devices have been developed in the art for eliminating harmonics currents and their effects. Examples of these systems, components and devices include: power system line reactors including air core reactors, iron core reactors, resonant L-C filters, serial, line AC chokes, active filters, hybrid filters, shunt passive filters, series passive filters, zigzag transformers and transformer load tap changers, among others.

Power system reactors are frequently used in combination with resistors and capacitors to create passive harmonics filters. These frequency power system reactors are generally iron-core or air-core. Passive harmonics filters usually are designed consisting of a number of parallel-connected series resonance circuits disposed between the power supply line and the electrical ground. Each passive harmonics filter is tuned to a specific unwanted harmonics current frequency that is desired to be suppressed and thereby do not allow the unwanted harmonics frequency to travel to the utility power grid. In order to filter out higher harmonics frequencies a high-pass filter is commonly used.

State-of-the-art tuned passive harmonics filters, such as shown in FIG. 1, can be easily overloaded by harmonics currents from a utility power grid and/or other non-linear loads connected to the same network due to the designed low harmonics impedance of those tuned passive harmonics filters which makes filtering the harmonics currents properly difficult. This problem has been partially solved by the implementation of derailleur mechanisms, but these mechanisms had and still have significant problems. For example, derailleurs often warm up because their design has not been implemented properly in order to deal with imported harmonics of an electrical network. The prior art has extensively described improved designs and use of tuned passive harmonic filters. Examples of this prior art is shown in, e.g., FIG. 1 of U.S. Pat. No. 3,555,291 and FIGS. 3 and 5 of U.S. Pat. No. 5,444,609. These Figures illustrate a prior art tuned and series-tuned high-pass harmonics filters. Each of the filter elements are tuned to specific harmonics frequencies that are desired to be eliminated. Most of these prior art mechanisms also are specifically designed to avoid importing harmonics from the electrical distribution system which has the effect of isolating the local facility electrical system from the utility power grid by adding power decoupling reactors, such as shown in FIG. 2 of the present disclosure, in series with the electrical distribution system power phase energy lines.

Other prior art mechanism are designed to import harmonics from the electrical distribution system for use in powering specifically linear electrical loads that are not the earth. Examples of this prior art is illustrated in FIGS. 1A, 1B, 2, 3, 4, 5 and 6 of U.S. Patent Publication 2012/0313728. In these embodiments, the linear electrical loads are part of the tuned passive harmonics filter system and are said to capture the harmonics and it is also said that non-limiting examples of linear loads could be AC induction motors that apply torque to constant (time invariant) mechanical loads, and resistive lighting and heating elements. A major drawback of this system is that if the imported total harmonics currents value from the electrical utility changes constantly, then the powered linear electrical loads have to be capable of accepting extremely large maximum peaks of harmonics currents because this is the only electrical path to use and drive the total imported harmonics currents. Another drawback of the disclosed systems is that the effective use of this powering system is limited to a few linear loads while most of the modern industrial facilities are characterized by the widespread application of non-linear loads. Still further, another drawback is that the impedance of the linear electrical loads has to remain constant because any change of the impedance will detune the passive harmonics filters making them useless in importing the specific harmonics currents that they were designed to.

Despite the fact that there are many designs of power systems reactors and passive harmonics filters in the prior art, they suffer from a number of disadvantages. Tuned passive harmonics filters systems such as shown in FIG. 2 are specifically designed to avoid importing harmonics from the electrical distribution system, thus isolating the local facility electrical system from the utility power grid by adding very large high-power reactors, element 210 in FIG. 2, in series with the electrical distribution energy lines. Because large currents are going to be handled by traditional passive harmonics filters most of the time, as shown in FIG. 2, an air-core reactor 110 is usually chosen as the option to use. However, an air-core reactor is a very large unit, made of large coils of wire. An air core reactor also has to be placed outdoors on large aluminum structures (steel structures could affect the magnetic performance of the unit, so they are not usable). Air-core reactors are very costly as well, and the maintenance, inspection and service are complicated.

If passive harmonics filters such as shown in FIG. 2 are made with iron core reactors 110, then reactors can easily become overloaded and saturated if too much harmonics currents flow through the reactor. This is especially true for high frequency currents and results in the reduction of the reactance; thus, a lot of magnetic flux can be generated in a magnetic material before the magnetic core goes into saturation, and the coil reverts back to an air-core. In addition, it is not uncommon for iron core reactors to be easily damaged due to overheating of the iron core caused by the flow of eddy currents along the core. Thus, traditional tuned passive harmonics filters such as shown in FIG. 2 do not import harmonics currents flowing at the utility power grid and as a result an opportunity to utilize this energy in favor of the end customer is missed.

Thus, a need exists in the art for providing harmonics filters that are not very large units.

A need also exists in the art for providing harmonics filters that do not need to be placed outdoors on large structures.

A need also exists in the art for providing harmonics filters that are not very costly, as well providing easier maintenance, inspection and service.

In addition, a need exists to provide harmonics filters that are not easily damaged due to overheating of the core, such as with iron core reactors, due to the flow of eddy currents along the core.

Still further, a need exists to provide harmonics filters core reactors that import harmonics currents flowing at the utility power grid and as a result provide an opportunity to utilize this energy.

Moreover, a need exists to provide harmonics filters that do not become easily overloaded and saturated if too much harmonics current is imported from the utility power grid flows through the reactor.

These and other needs are met by the harmonics filters of the present disclosure. The harmonics filters of the present disclosure provide many advantages such as being smaller than air-core reactors because the semi non-magnetic core has a higher permeability core than air. The more compact size improves the use of space resulting in a convenient and clean installation. The harmonics filters of the present disclosure also eliminate the undesirable characteristics of a ferromagnetic core (eddy current losses, hysteresis, saturation, and the like).

Any steel structure around the semi non-magnetic core reactor has almost no influence on the inductance value of the coil. The semi non-magnetic cores are not saturated with magnetic flux thus there is no change in reactance value. The semi non-magnetic cores can be installed at indoor facilities.

The harmonics filters of the present disclosure provide an excellent option for high voltage, extra-high voltage, and/or large current applications due to their size and weight. The harmonics filters of the present disclosure also decrease the requirement for increased ampacity (capability of conductors to carry current) of conductors and are better at internal cooling due to the lack of flow of eddy currents along the core.

In addition, the harmonics filters of the present disclosure provide considerably simplified manufacture due to the low component count of materials, wire and labor time as compared to the same electric-capacity-capable options of air core and iron core reactors. As a result, the harmonics filters of the present disclosure provide reduced manufacturing cost as compared to same electric-capacity-capable options of air core and iron core reactors, as well as easier maintenance, inspection and service, thereby providing reliable and trouble-free operation over an extended period of use.

Also, the harmonics filters of the present disclosure are capable of properly handling the ever-changing total harmonics value imported from a utility power grid, without any need of an electric component to be added to the filters. As a result, the heater maintains a high degree of efficiency.

The harmonics filters of the present disclosure improve the total system performance by reducing line side current harmonics that are generated by non-linear loads and create energy savings, as well as increasing the life of the non-linear loads, and can be used at any time regardless of the existence of harmonics currents generated by the end user facility. The harmonics filters of the present disclosure provide a 100% pollution-free electromagnetic induction heater using harmonics current imported from the electrical power system as a working source and with a zero-cost heating process.

SUMMARY OF THE DISCLOSURE

The present disclosure is a semi non-magnetic bobbin for use in core reactors in which the semi non-magnetic bobbin has: a non-metallic central section having a length and two ends, wherein the central section is hollow and has an opening disposed at each end, a non-metallic flange disposed at each end, wherein each flange has an opening sized and configured to coincide with the opening at each end, wherein each flange has a portion disposed away from the central section, and wherein at least one flange has at least one through-hole disposed in the portion disposed away from the central section. Preferably, the central section is substantially cylindrical in shape and is designed and configured to accept windings of wire there-around. Preferably also, the hollow of the central section is designed and configured to accept a pipe, cable or encased plurality of wires therethrough. Also preferably, each flange is of a substantially circular "plate-like" configuration and is designed and configured to act as stop to limit the windings to the length of the central portion. The opening of each flange is preferably designed and configured to accept a pipe, cable or encased plurality of wires therethrough, and more preferably, the same pipe, cable or encased plurality of wires that passes through the hollow of the central section. Also, the at least one through-hole is preferably designed and configured to provide an entry and/or exit point for the windings around the central section. Preferably the non-metallic central section and the non-metallic flanges are comprised of a ceramic material that may be slightly porous or non-porous. The non-metallic material can be made of resin, clay/brick, cement, nylon, amide or any other non-metallic material. Preferred are ceramics because there is no heating of the central section or of the flanges due to the lack of eddy currents. If the core is a metallic material it will then act as an induction heater, i.e., the core will receive the heat that is produced and would be prone to failure thereby. From a characteristic/materials attribute point of view, the bobbin should be: (1) a non-metallic high-temperature insulating material, which is provided by the aforementioned resin, clay/brick, cement, nylon, amide, nylon/amid composites and ceramics because there is not much heating due to the lack or absence of eddy currents; and (2) a non-magnetic material, as non-magnetic is generally understood, where the material is completely non-magnetic or slightly magnetic. As is known, magnetic fields are commonly measured in gauss units and, for example, a typical refrigerator magnet has a magnetic field of about 50 gauss, the Earth's core has a magnetic field of about 25 gauss, and the Earth's surface has a magnetic field of about 0.25-0.60 gauss. Preferably, a material that is 100% non-magnetic, i.e., below about 50 gauss or lower, as indicated above, should be used.

The semi non-magnetic bobbin of the present disclosure finds use in core line reactors (known as series inductors) that can be designed to any inductance and ampacity value. The semi non-magnetic bobbin of the present disclosure also finds use in harmonics filters and in passive harmonics filters to import and handle safely very large harmonics currents from an AC utility power grid system and at the same time stop and filter the harmonics currents that are produced at the end user industrial facilities where the filter is installed, independent of the connected electrical load. Thus, these harmonics currents can be mathematically added and used in favor of the end consumer, as well as eliminate the harmonics currents by connecting the filters directly to ground.

The present disclosure provides semi non-magnetic bobbins that are useful to create line reactors (series inductors) that can be designed to any inductance value. The present disclosure also provides semi non-magnetic bobbins that are useful for providing improved harmonics filters for alternative current circuits, and particularly to improved passive filters, that overcome the typical problems associated with ordinary tuned harmonics filters that import harmonics currents from a power distribution system and the industrial facilities itself. The present disclosure provides semi non-magnetic bobbins that are useful for mathematically adding these currents and use them in favor of the end user.

BRIEF DESCRIPTION OF THE DRAWINGS

Further features, advantages and details of the present disclosure will become apparent from the following description of the drawings in which like numbers denote like elements and in which:

FIG. 3A is a perspective view of a bobbin according to the present disclosure;

FIG. 4A is a cross-sectional view of the semi non-magnetic core line reactor assembly according to FIG. 4 of the present disclosure;

FIG. 5B is a top view of the semi non-magnetic core tapping line reactor assembly as shown in FIG. 5A;

FIG. 5C is a schematic circuit diagram of the semi non-magnetic core tapping line reactor assembly as shown in FIG. 5A;

FIG. 6A is a cross-sectional view of a semi non-magnetic core voltage transformer assembly according to another embodiment of the present disclosure;

FIG. 7B is a top view of the semi non-magnetic core isolation transformer assembly as shown in FIG. 7A;

FIG. 8A is a cross-sectional view of a semi non-magnetic core buck transformer assembly according to another embodiment of the present disclosure;

FIG. 11A is a perspective view of a semi non-magnetic core line reactor assembly according to the present disclosure;

DETAILED DESCRIPTION OF THE PREFERRED EMBODIMENTS

Figure 1:
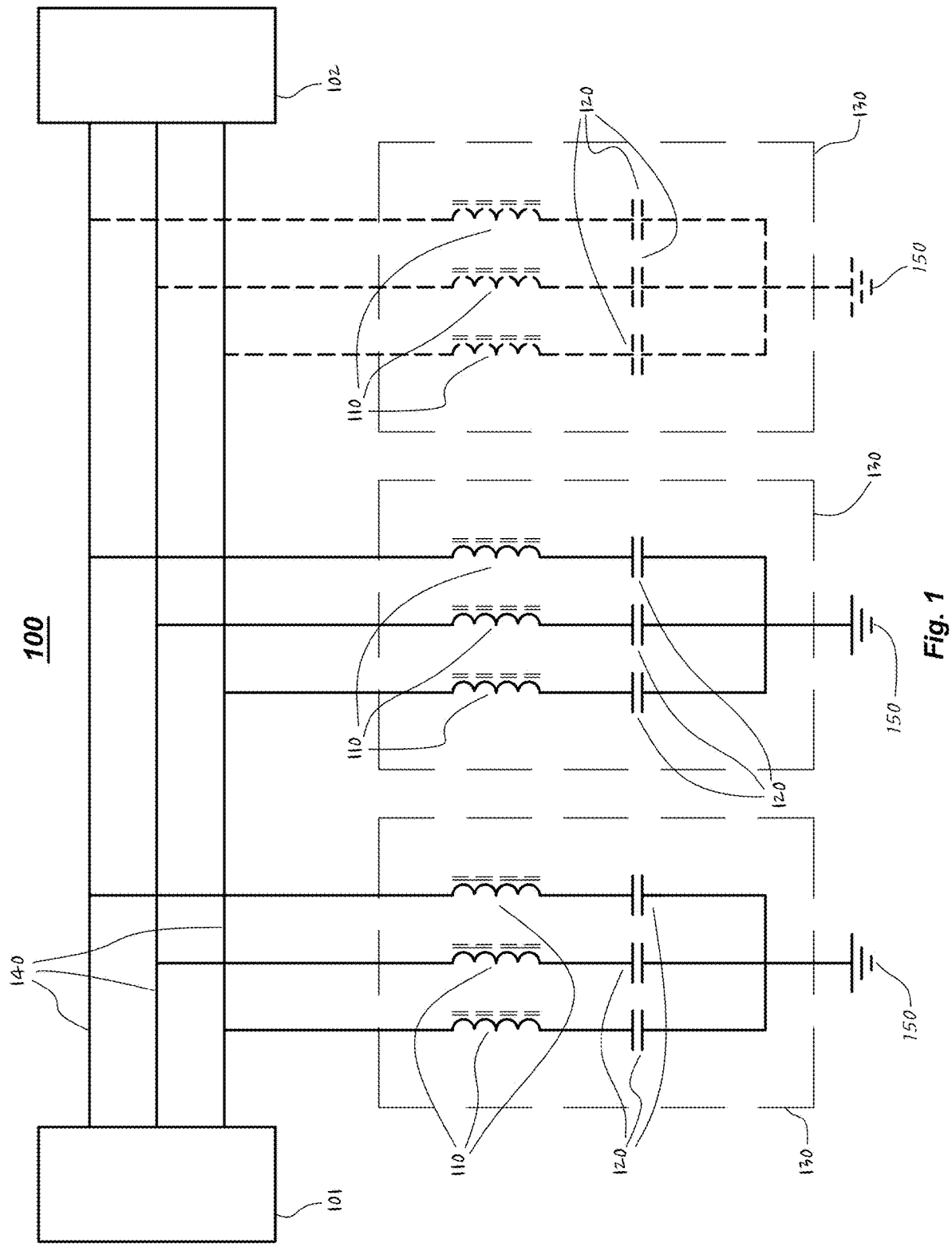
FIG. 1 is a simplified schematic circuit diagram of a state-of-the-art typical harmonics filter without a series decoupling inductor.

FIG. 1 illustrates a state-of-the-art passive harmonics filter assembly 100. In FIG. 1, passive harmonics filter assembly 100 is disposed between utility power grid 101 and local facility electrical system 102. Frequently, passive harmonics filter assembly 100 comprises a plurality of series-connected core reactors 110 and capacitors 120 to create passive harmonics filter circuits 130. In FIG. 1, passive harmonics filter circuits 130 power system reactor could be an iron-core or air-core 110. Passive harmonics filter assembly 100 has usually been designed consisting of a number of parallel-connected passive harmonics filter circuits 130 between the power supply lines 140 and electrical ground 150, each passive harmonics circuit 130 is tuned to a specific unwanted harmonics current frequency desired to be suppressed. To filter out higher harmonics frequencies it is common to use a high-pass passive harmonics filter 130. Specifically, tuned passive harmonics filters 130 can be easily overloaded by harmonics currents imported from the utility power grid via input 101 and/or other non-linear loads connected to the same network due to their designed low harmonics impedance. This makes proper filtering difficult. This problem has been partially solved by the implementation of derailleur mechanisms, but these had and still have significant problems.

Figure 2:
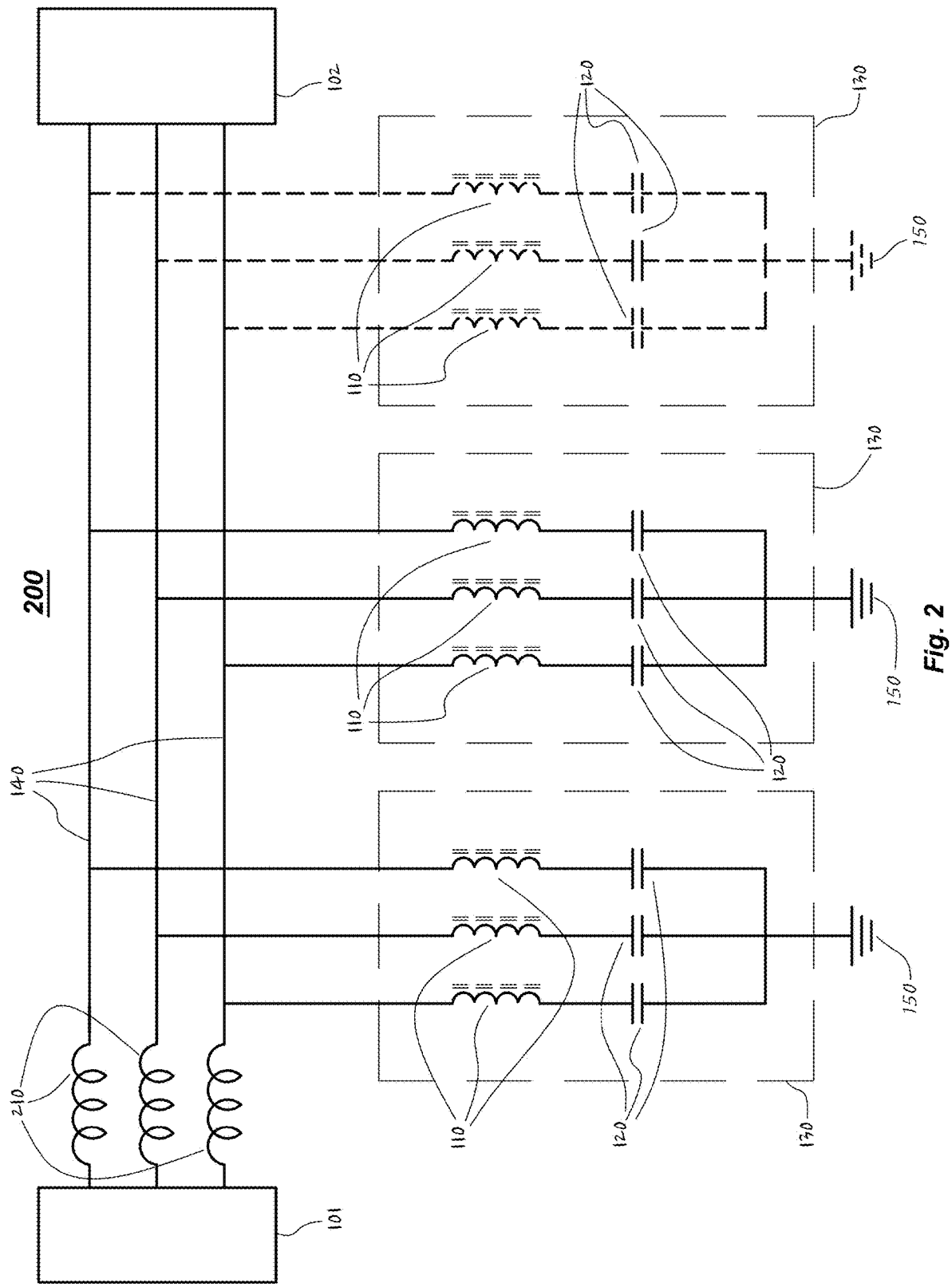
FIG. 2 is a simplified schematic circuit diagram of a state-of-the-art typical harmonics filter with a series decoupling inductor.

FIG. 2 Illustrates a well-known passive harmonics filter assembly 200 that is intended to overcome the shortcomings of the prior art tuned passive harmonics filter assembly 100 of FIG. 1. Passive harmonics filter assembly 200 is specifically designed to avoid importing any harmonics from the electrical distribution system, thus isolating the local facility electrical system from the utility power grid. This isolation is accomplished by adding a plurality of power decoupling reactors 210 in series with the electrical distribution system power supply lines 140. The filtering capability of passive harmonics filter assembly 200 depends mainly on the tuned passive harmonics filters 130 that capture inner harmonics produced at the end user site. Power decoupling reactors 210 provide enough impedance so as not to import any harmonics current flowing from the utility's power grid into the local facility electric system. As mentioned earlier with respect to FIG. 1, if passive harmonics filter assembly 100 lacks power decoupling reactors 210 in series with the electrical power grid, undesirable imported harmonics currents would create in, e.g., iron-core reactors 110 saturation if too much current flows through them, resulting in damage due to severe heating problems because of the flow of eddy currents along the core, and will also suffer of the disadvantages noted above. Because most of the time large currents are going to be handled by traditional passive harmonics filters assembly 130, an air-core reactor 110 is the generally the option to use. An air-core reactor has many of the shortcomings addressed by the present disclosure in that air-core reactors are very large (made of large coils of wire) and have to be placed outdoors on large aluminum structures (steel structures could affect the magnetic performance of the unit, so they are not usable). Moreover, they are costly, and the maintenance, inspection and service are complicated. If passive harmonics filters 130 are made with iron-core reactors 110 instead, then reactors can be easily overloaded and saturated if too much harmonics current flows through them and this can result in the reduction of the reactance and much magnetic flux can be generated in a magnetic material before the magnetic core goes into saturation, and the coil reverts back to an air-core. As mentioned above, passive harmonics filter assembly 200 does not import harmonics currents flowing at the utility's power grid, thus missing the opportunity to utilize this energy in favor of the end consumer.

Figure 3B:
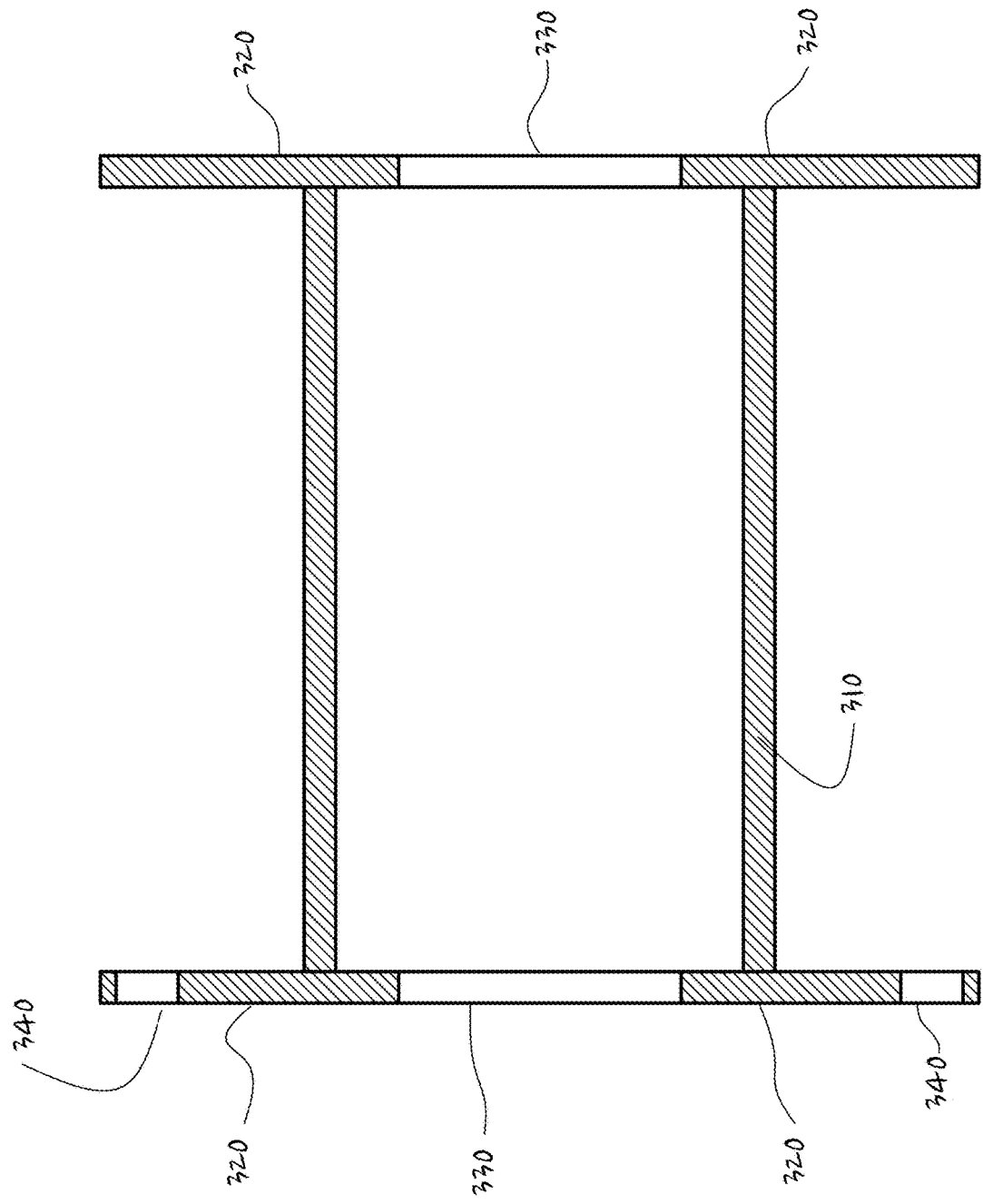
FIG. 3B is a cross-sectional view of a bobbin according to the present disclosure.

FIG. 3A is one embodiment of a bobbin according to the present disclosure and FIG. 3B is a cross-sectional view of that embodiment. This embodiment has a bobbin 300 that has a cylindrical semi non-magnetic core 310 and two planar circular flanges 320 that are joined to cylindrical semi non-magnetic core 310. Semi non-magnetic core 310 is made of a high-temperature resistant non-magnetic material. However, semi non-magnetic core 310 can have different shapes such as oval, triangular, circular, among others. Different core sizes and different materials, such as high-temperature, waterproof and humidity resistant non-magnetic ceramic, cement, resins, among others, are all suitable for various applications. Bobbin 300 also includes a center hole 330 and a plurality of flange holes 340, the function of which will be explained in conjunction with other Figures. Semi non-magnetic core 310 is used as the base core to provide the improvements of the present disclosure to most of the electric components that have been developed in the prior art such as: line reactors (inductors) FIGS. 4A-4C, tapping line reactors FIGS. 5A-C, voltage transformer FIGS. 6A-C, isolation transformers FIG. 7A-C, buck transformers FIGS. 8A-C, boosting transformers FIGS. 9A-C and zigzag transformers (not shown) among others that will be understood to be applicable to those of skill in the art. Core 310 can be used in applications for eliminating harmonics currents, if desired. The necessary windings 410 (see, e.g., FIG. 4A) for the manufacture of the above-mentioned electric components can be fabricated from copper, aluminum or with other well-known electrically insulated magnet wire and can be wound around semi non-magnetic core 310 using a coil winding machine that rotates the bobbin while the wire is moved laterally back and forth to channel the winding. For those skilled in the art of inductors and transformers according to the dot convention, the start of a winding is indicated by a dot 420 (see, e.g., FIG. 4A). The dot markings in transformers indicate terminals of corresponding polarity at all instants of time. The winding configuration described above can provide a termination, tapping or other connection method to any other electrical system component. The purpose of semi non-magnetic core 310 is to fix the inductance values of the above-mentioned components and to increase their mutual coupling, which is achieved by the bobbin 300 in the various embodiments of the present disclosure.

Figure 4:
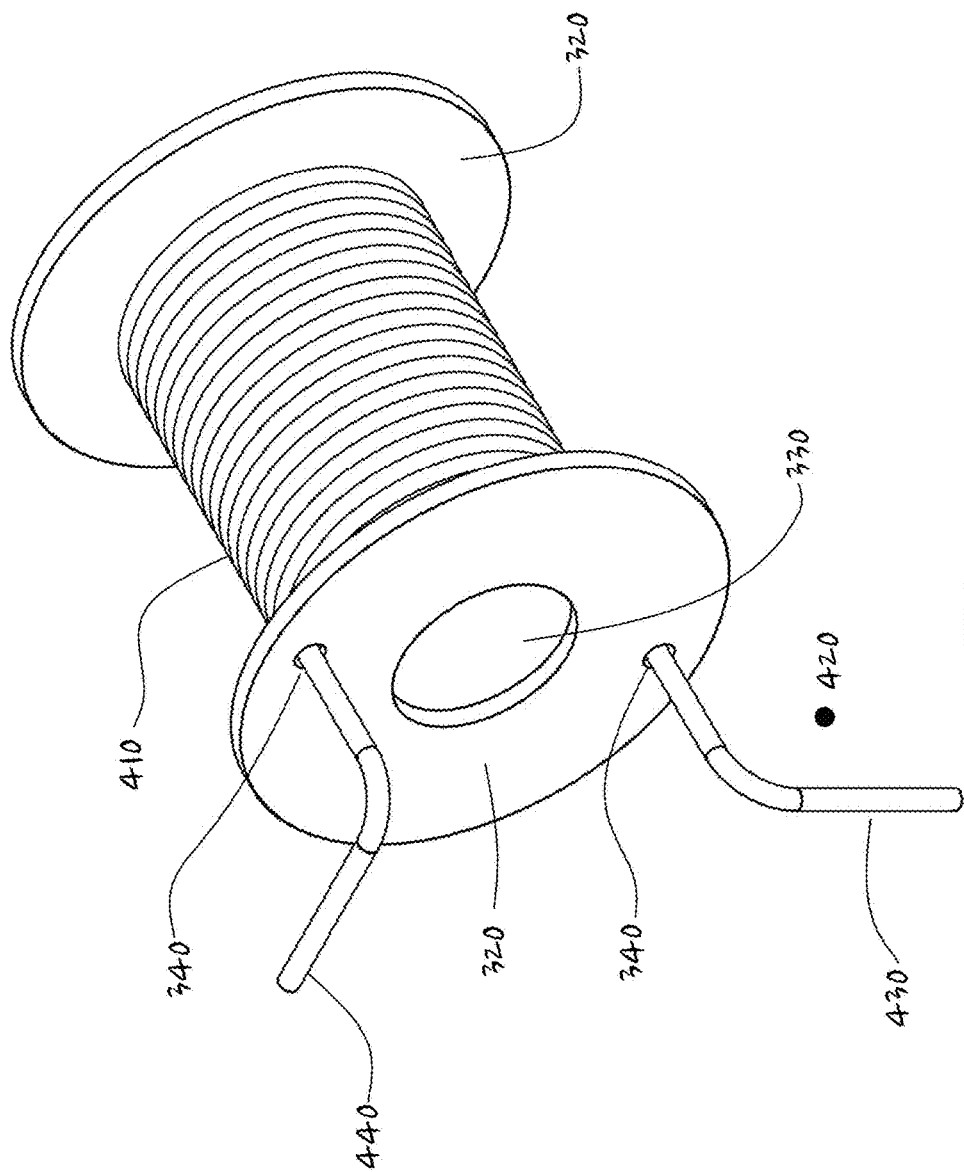
FIG. 4 is a perspective view of a semi non-magnetic core line reactor assembly according to one embodiment of the present disclosure.
Figure 4B:
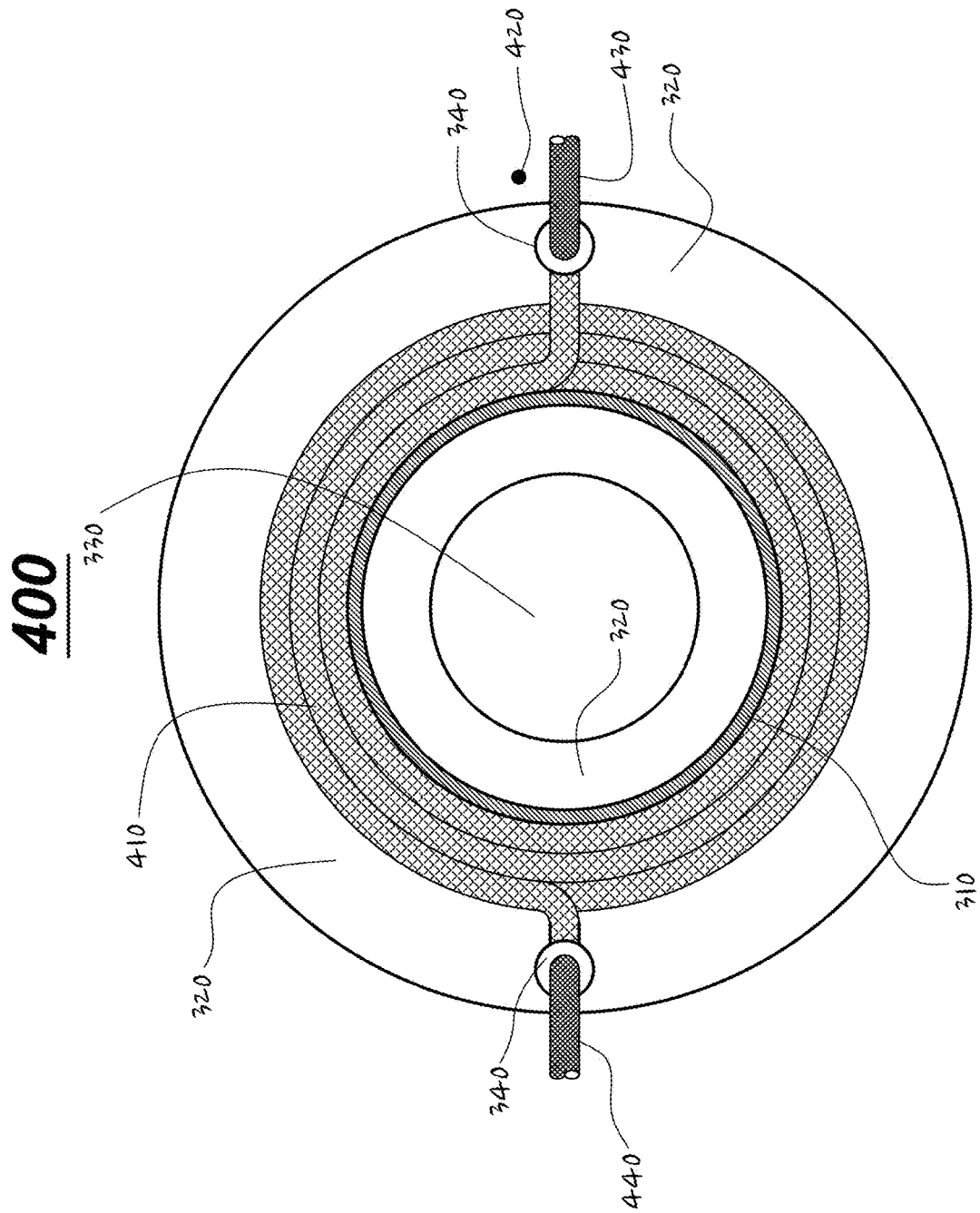
FIG. 4B is a top cut-away view through line "A"-"A" of the semi non-magnetic core line reactor assembly as shown in FIG. 4A.
Figure 4C:
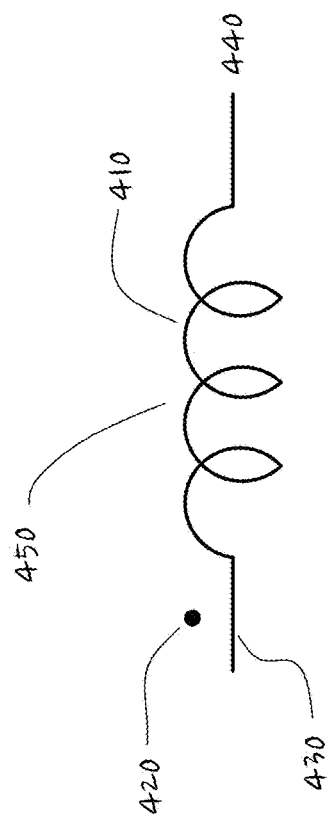
FIG. 4C is a schematic circuit diagram of the semi non-magnetic core line reactor assembly as shown in FIG. 4A.
Figure 4D:
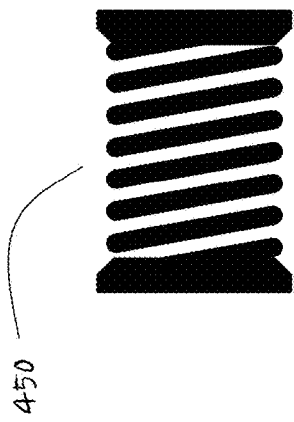
FIG. 4D is a symbol of the semi non-magnetic core line reactor assembly as shown in FIG. 4A.

FIGS. 4 and 4A are perspective and cross-sectional views, respectively, of a semi non-magnetic core line reactor assembly 400 according to one aspect of the embodiment. In FIG. 4, windings 410 enter and exit semi non-magnetic core line reactor assembly 400 at windings 410 entrance and exit points 430 and 440, respectively. In FIG. 4 windings are magnet wire. FIG. 4B is a top cut-away view of semi non-magnetic core line reactor assembly 400 as shown in FIG. 4A. FIG. 4C is a schematic circuit diagram of semi non-magnetic core line reactor assembly 400 as shown in FIG. 4A. FIG. 4D is a symbol circuit diagram 450 of semi non-magnetic core line reactor assembly 400 as shown in FIG. 4A. Symbol circuit diagram 450 comprises semi non-magnetic core 310 and windings 410 that is wound around semi non-magnetic core 310.

Semi non-magnetic core line reactor FIGS. 4, 4A, 4B, 4C and 4D (which is a series inductor as would be recognized by those of skill in the art) can be designed and tuned to (a) any current-carrying capacity by selecting the appropriate conductor ampacity size wire by using any standardized wire gauge system (i.e., American wire gauge (AWG)), (b) any inductance value by measuring the inductor value by any accepted measuring system, and (c) any length core size to meet the previous electric values. Any electric and/or industrial technology that uses semi non-magnetic bobbins 300 to produce semi non-magnetic core line reactor assembly 400 can deal with high electric flowing currents and high temperatures generated by this flowing current, thereby avoiding eddy current effect due to the use of a non-metallic core that is not magnetic.

The following are non-limiting examples of uses of semi non-magnetic core line reactor 400 of FIGS. 4, 4A, 4B, 4C, and 4D: (a) as a tuning reactor element in any multi-section shunt passive filter (i.e. tuned to a specific frequency in order to create a resonant circuit of the harmonics current it is intended to capture from the electrical power system for single-tuned filter and/or first, second or "n" order high pass filter); or (b) as a AC choke reactor (inserted impedance) to limit the current between parallel capacitors bank steps in order to avoid the back-to-back capacitor switching. The semi non-magnetic core line reactor 400 created with semi non-magnetic bobbin 300, have a very low impedance and high-quality factor, "Q", at the selected and tuned frequency or band of frequencies in order to capture most of the harmonics current at the frequency or band of frequencies selected.

Figure 5A:
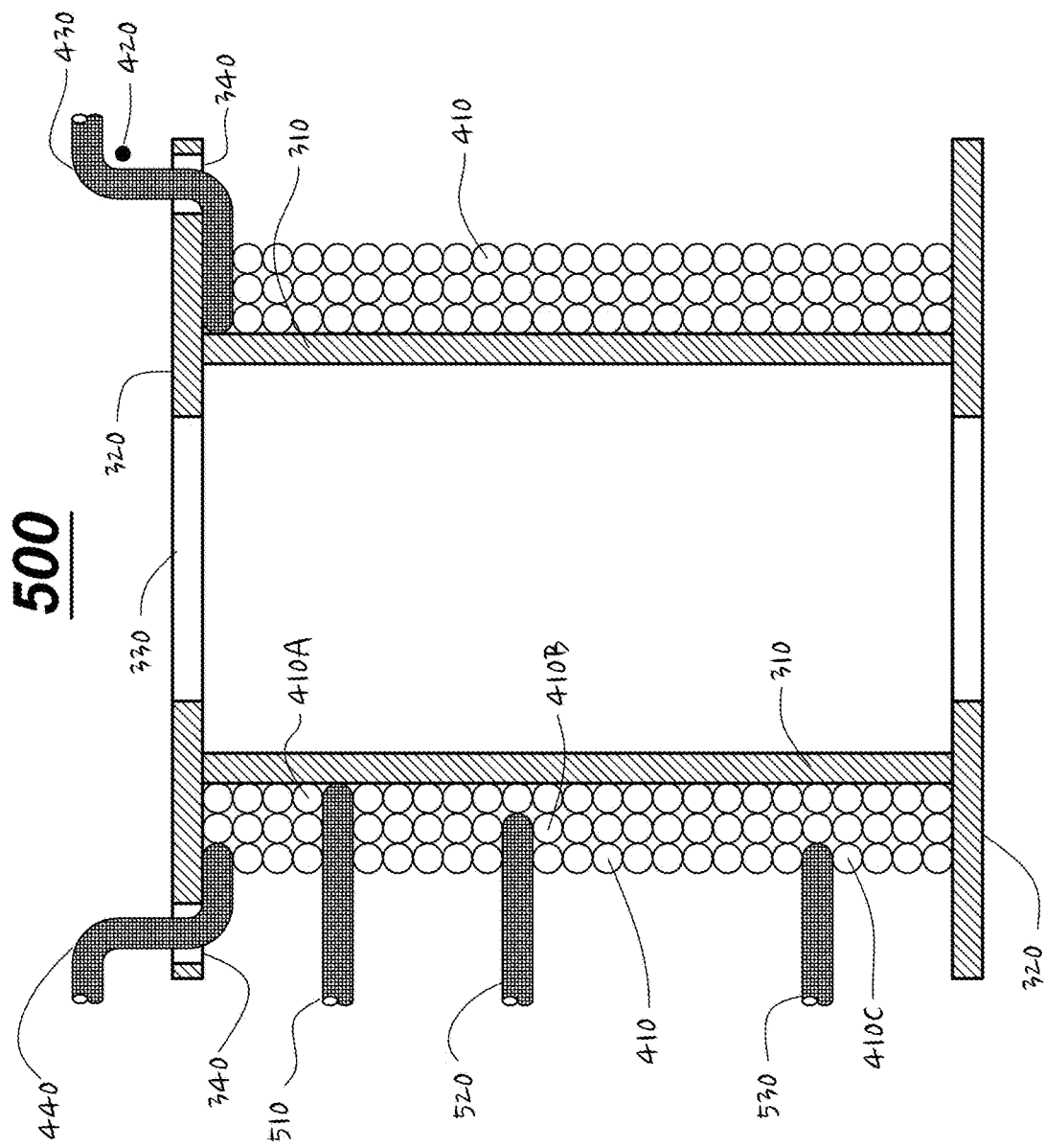
FIG. 5A is a cross-sectional view of a semi non-magnetic core tapping line reactor assembly according to one embodiment of the present disclosure.
Figure 6B:
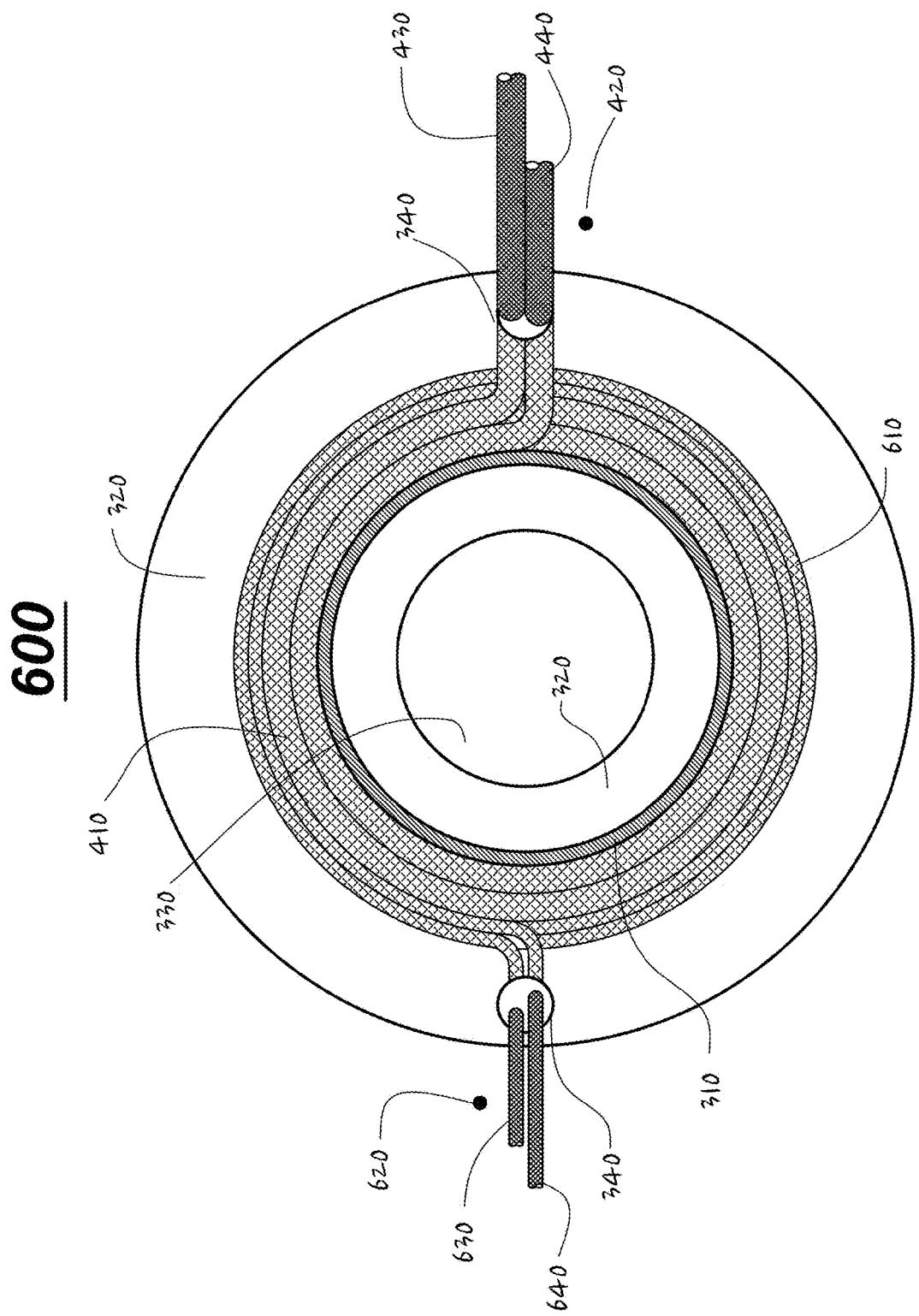
FIG. 6B is a top view of the semi non-magnetic core voltage transformer assembly as shown in FIG. 6A.
Figure 6C:
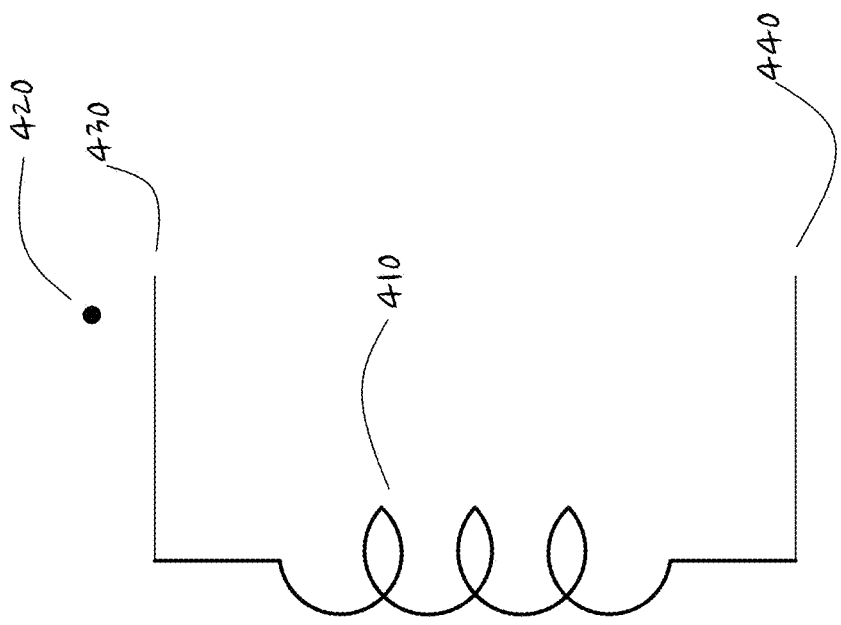
FIG. 6C is a schematic circuit diagram of the semi non-magnetic core voltage transformer assembly as shown in FIG. 6A.
Figure 6C:
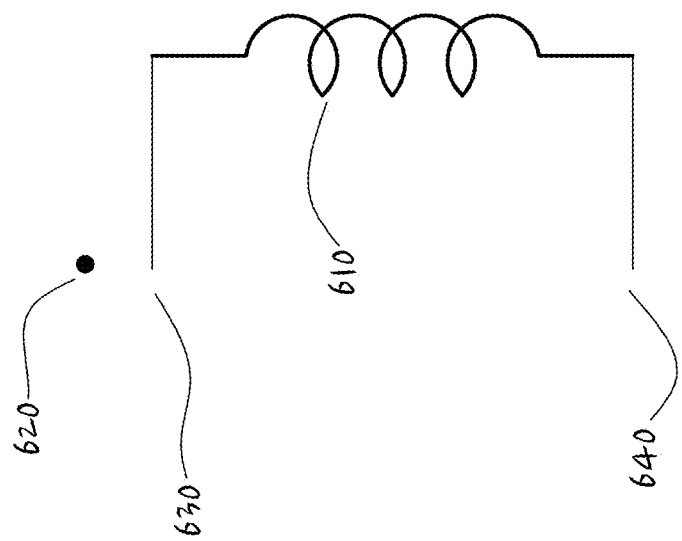

FIG. 5A is a semi non-magnetic core tapping line reactor assembly 500 according to another embodiment of the present disclosure. Semi non-magnetic core tapping line reactor assembly 500 differs from semi non-magnetic core line reactor 400 by having a plurality of tappings, here three tappings 510, 520 and 530, that emanate from each layer 410A, 410B and 410C of windings 410. FIG. 5B is a top view of semi non-magnetic core tapping line reactor assembly 500 as shown in FIG. 5A. FIG. 5C is a schematic circuit diagram 540 of semi non-magnetic core tapping line reactor assembly 500 as shown in FIG. 5A. Schematic circuit diagram 540 comprises windings 410 wound around the semi non-magnetic bobbin 300 with three tappings 510, 520 and 530.

Semi non-magnetic core tapping line reactor 500 (which is a series tapping inductor as would be recognized by those of skill in the art) can be designed and tuned to: (a) any current-carrying capacity by selecting the appropriate conductor ampacity size wire by using any standardized wire gauge system (i.e., American wire gauge (AWG)); (b) any inductance value by measuring the inductor value by any accepted measuring system; (c) any length core size to meet the previous electric values; or (d) any number of tapping connections along the windings. Any electric and or industrial technology that uses semi non-magnetic bobbins 300 acting as the core of semi non-magnetic core tapping line reactor 500 can deal with high electric flowing currents and high temperatures generated by this flowing current avoiding eddy current effect due to the use of a non-metallic core that it is not magnetic.

Examples of uses of semi non-magnetic core tapping line reactor 500 include a tuning reactor element in any multi-section shunt passive filter (i.e., tuned to a specific frequency in order to create a resonant circuit of the harmonics current it is intended to capture from the electrical power system for single-tuned filter and/or first, second or "n" order high pass filter) with any number of tapping connections in order to connect them with several electric components of the system to be filtered. These embodiments do not depend on any particular kind of connection thus many connection ways are possible. The semi non-magnetic core tapping line reactor 500 using semi non-magnetic bobbins 300 has a very low impedance and high-quality factor "Q" at the selected and tuned frequency or band of frequencies in order to capture most of the harmonics current at the frequency or band of frequencies selected.

FIG. 6A is a semi non-magnetic core voltage transformer assembly 600 according to another embodiment of the present disclosure. In addition to having windings 410 and windings entrance and exit points 430 and 440, semi non-magnetic core voltage transformer assembly 600 of FIG. 6A includes second windings 610, second windings start point 620, and second windings 610 entrance and exit points 630 and 640, respectively. Second windings 610 are of a lesser gauge wire than windings 410. FIG. 6B is a top view of semi non-magnetic core voltage transformer assembly 600 as shown in FIG. 6A. FIG. 6C is a schematic circuit diagram of semi non-magnetic core voltage transformer assembly 600 as shown in FIG. 6A. This embodiment has windings 410 wound around semi non-magnetic bobbin 300 (not shown), and second windings 610 wound around the windings 410. Because windings 410, 610 do not have iron cores, this embodiment utilizes windings 410, 610 that are loosely coupled. Loosely coupled circuits cannot be characterized by turns ratios; rather, they are characterized by self- and mutual-inductances. The wire gauge can differ between windings 410, 610, as shown in FIG. 6A. It will be appreciated by a person skilled in the art that in order to make semi non-magnetic core voltage transformer assembly 600 there are mutual voltages, coefficient of coupling, inductors with mutual coupling and other technical aspects to be considered, and that the start of the windings may be placed on either one of the both inductor's two ends, resulting in various configurations to achieve different polarities and coupling effects.

Semi non-magnetic core voltage transformer assembly 600 can be designed to: (a) any input or output voltage and current-carrying capacity by selecting the appropriate conductor ampacity size wire by using any standardized wire gauge system (i.e., American wire gauge (AWG)); (b) any inductance value by measuring the inductor value by any accepted measuring system, (c) any length core size to meet the previous electric values; (d) any numbers of turns; (e) any frequency of operation; and (f) proper windings along the length core to make two or more mutually coupled windings. Any electric and/or industrial technology that uses semi non-magnetic bobbins 300 as the core of semi non-magnetic core voltage transformer assembly 600 can deal with high electric flowing currents and high temperatures generated by these flowing currents avoiding eddy current effects due to the use of a non-metallic core that it is not magnetic.

Examples of uses of semi non-magnetic core voltage transformer assembly 600 include voltage or current transformers.

Figure 7A:
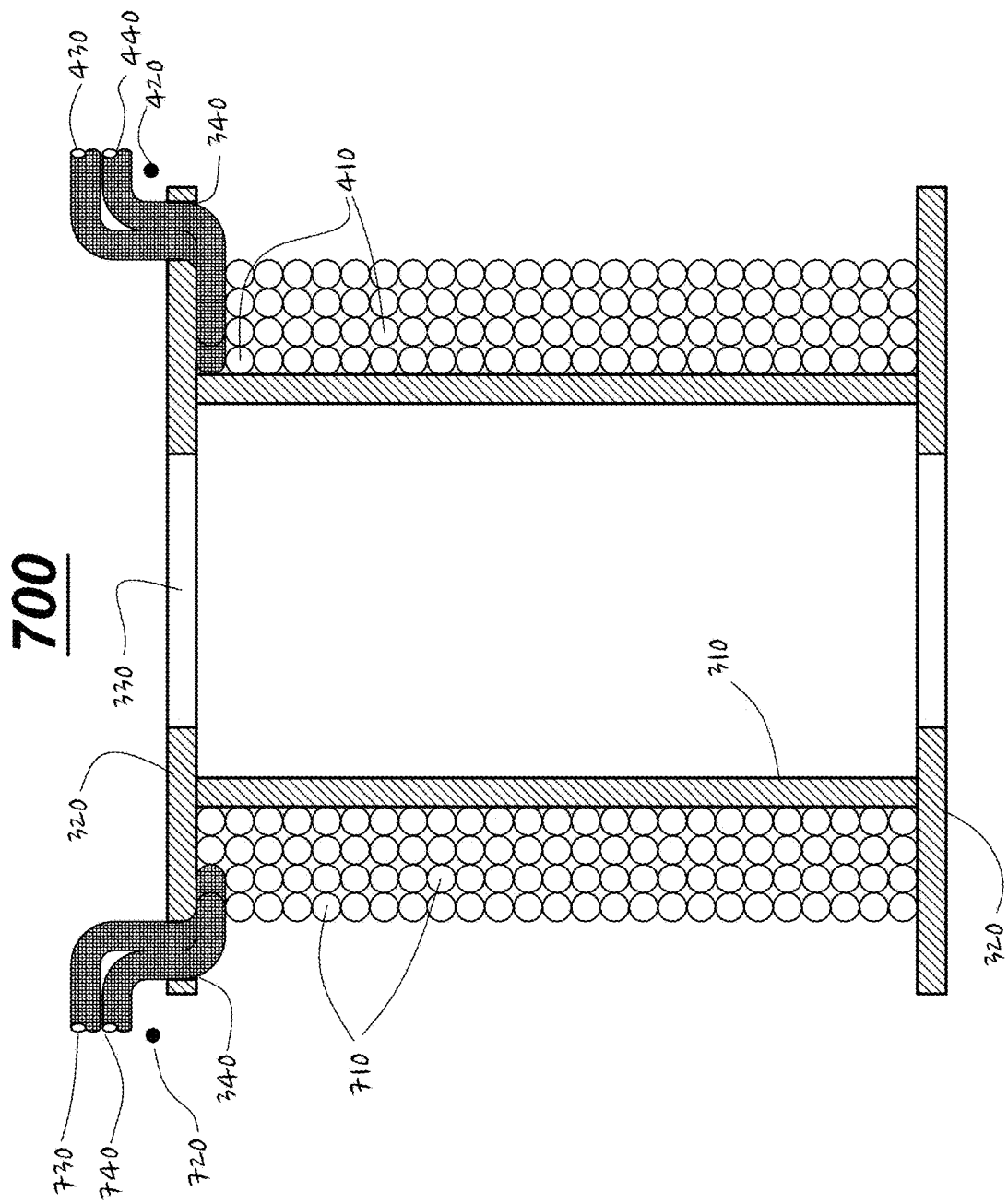
FIG. 7A is a cross-sectional view of a semi non-magnetic core isolation transformer assembly according to another embodiment of the present disclosure.
Figure 7C:
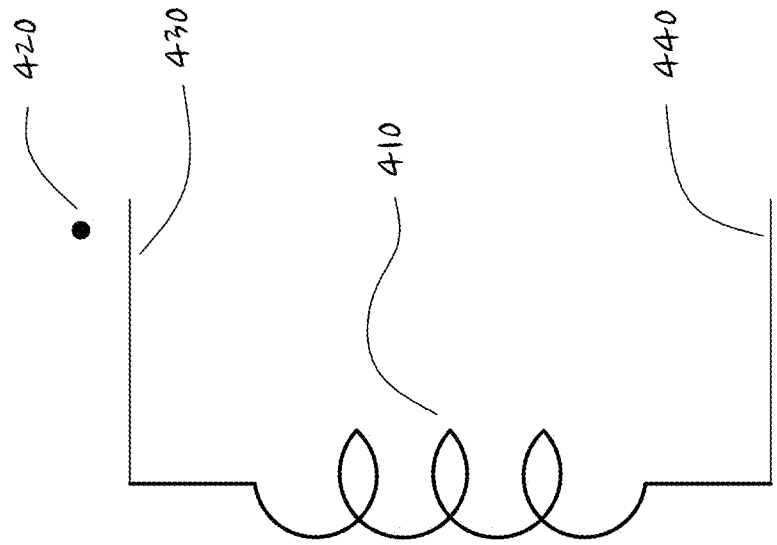
FIG. 7C is a schematic circuit diagram of the semi non-magnetic core isolation transformer assembly as shown in FIG. 7A.
Figure 7C:
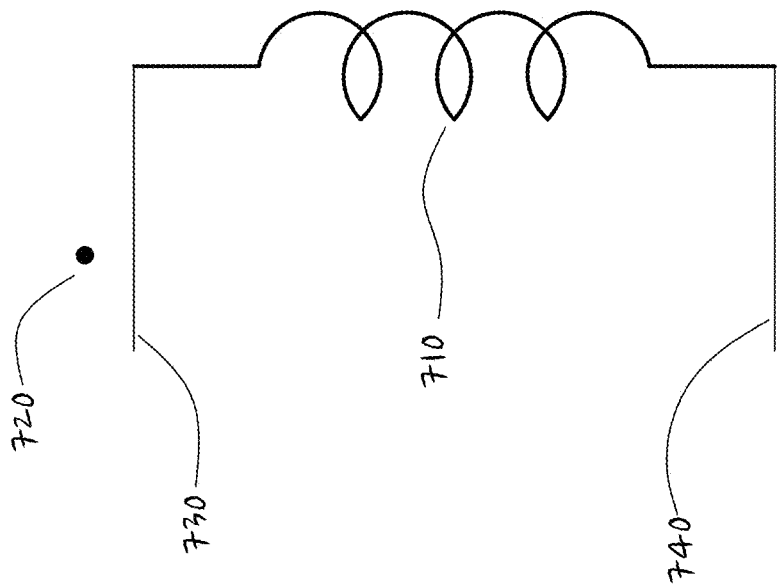

FIG. 7A is a semi non-magnetic core isolation transformer assembly 700 according to another embodiment of the present disclosure. In addition to having windings 410 and windings entrance and exit points 430 and 440, semi non-magnetic core isolation transformer assembly 700 of FIG. 7A includes second windings 710, second windings start point 720, and second windings 710 entrance and exit points 730 and 740, respectively. In the embodiment shown in FIG. 7A, second windings 710 are of the same gauge wire as windings 410. FIG. 7B is a top view of semi non-magnetic core isolation transformer assembly 700 shown in FIG. 7A. FIG. 7C is a schematic circuit diagram of semi non-magnetic core isolation transformer assembly 700 as shown in FIG. 7A. This embodiment has windings 410 wound around semi non-magnetic bobbin 300 (not shown), and second windings 710 wound around windings 410. Because windings 410, 710 do not have iron cores, the embodiment utilizes windings 410, 710 that are loosely coupled. As noted above, loosely coupled circuits cannot be characterized by turn ratios; rather, they are characterized by self- and mutual-inductances. Although schematically shown as the same in FIGS. 7A-7C, the wire gauge can differ between windings 410 and second windings 710. The core isolation transformers shown in FIGS. 7A-7C have a 1:1 transformation ratio. It will be appreciated by a person skilled in the art that in order to make semi non-magnetic core voltage transformer assembly 700 there are mutual voltages, coefficient of coupling, inductors with mutual coupling and other technical aspects to be considered, and that the start of the windings may be placed on either one of the both inductor's two ends, resulting in various configurations to achieve different polarities and coupling effects.

Semi non-magnetic core isolation transformer assembly 700 can be designed to: (a) any input or output voltage and current-carrying capacity by selecting the appropriate conductor ampacity size wire by using any standardized wire gauge system (i.e., American wire gauge (AWG)); (b) any inductance value by measuring the inductor value by any accepted measuring system; (c) any length core size to meet the previous electric values; (d) any numbers of turns; (e) any frequency of operation; and (f) proper windings along the length core to make two or more mutually coupled windings. Any electric and/or industrial technology that uses semi non-magnetic bobbins 300 acting as the core of semi non-magnetic core isolation transformer assembly 700 can deal with high electric flowing currents and high temperatures generated by these flowing currents avoiding eddy current effects due to the use of a non-metallic core that it is not magnetic.

Examples of uses of isolation transformers include isolation transformers supplying multiple drives (one drive with delta-wye isolation transformer with a second drive with delta-delta isolation transformer) create an effective 12-pulse harmonics filter operation mainly because the fifth and seventh harmonics are canceled out.

Figure 8B:
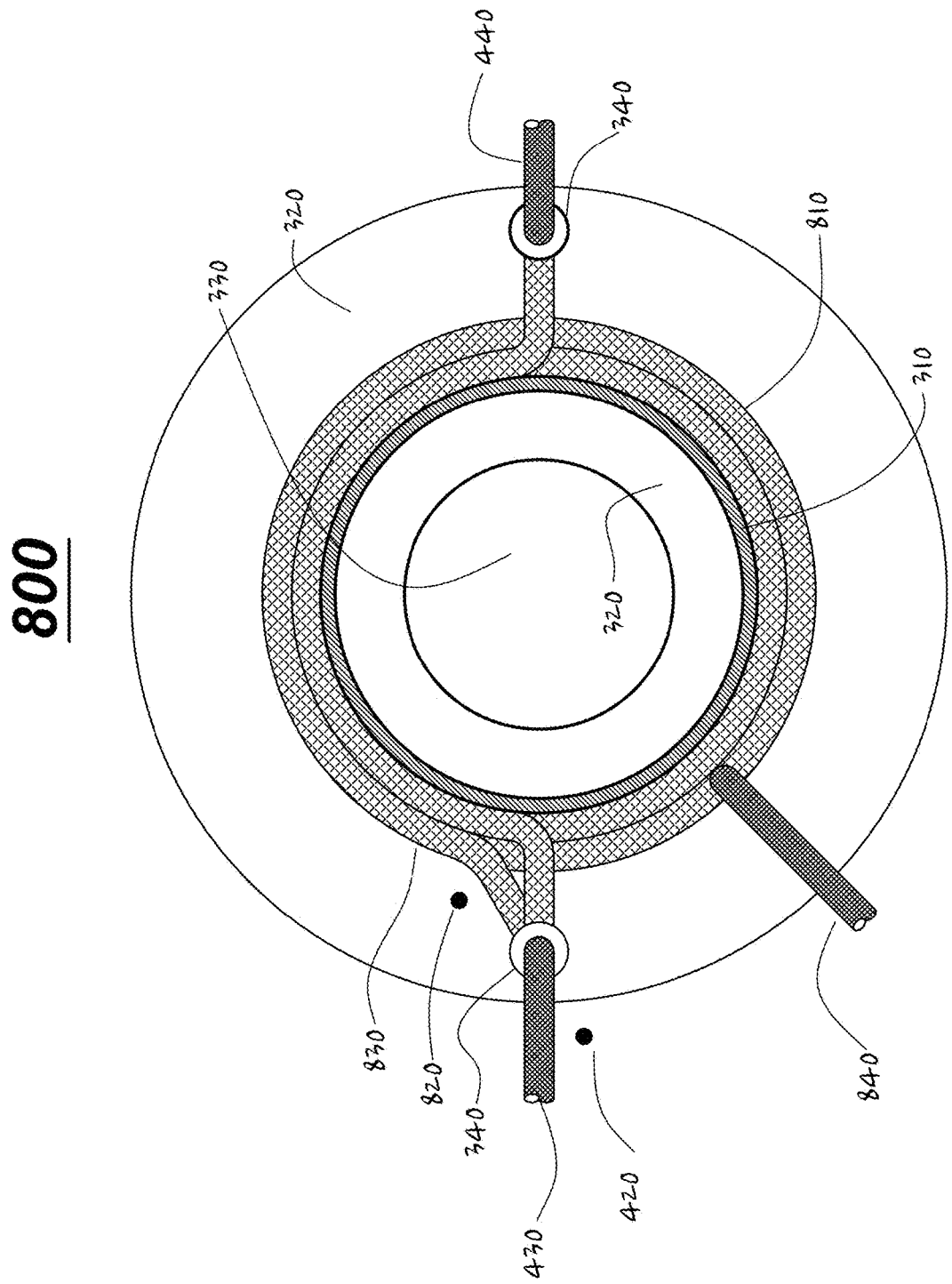
FIG. 8B is a top view of the semi non-magnetic core buck transformer assembly as shown in FIG. 8A.
Figure 8C:
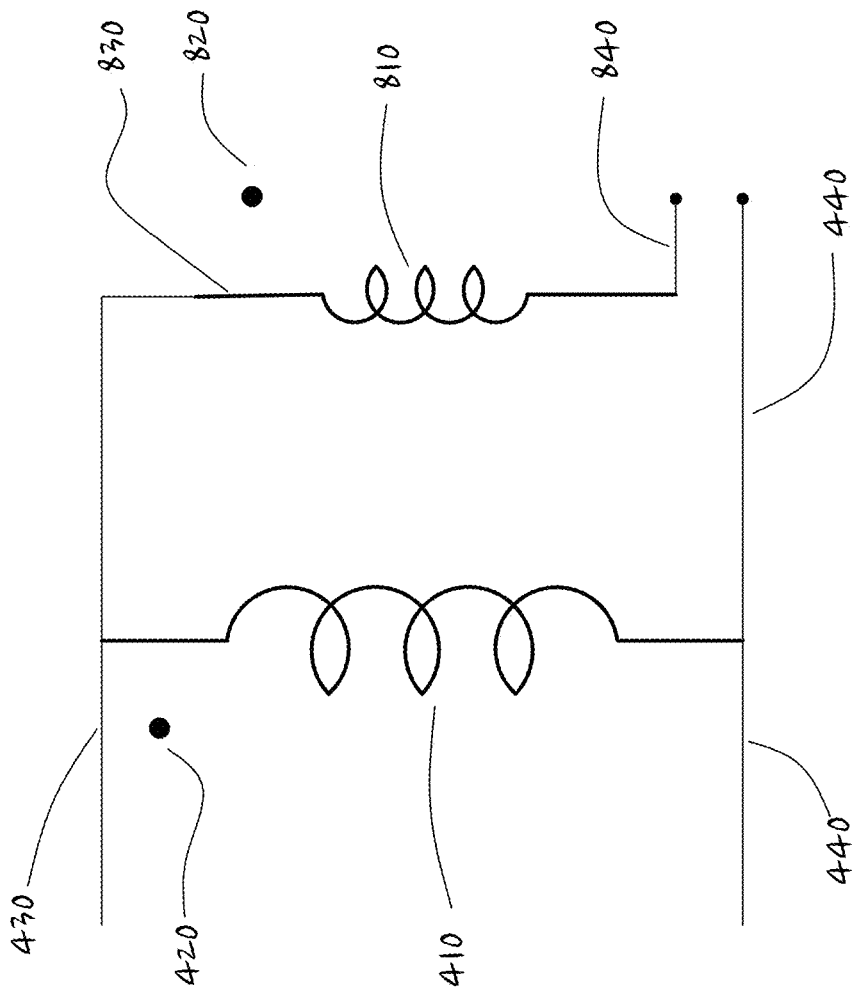
FIG. 8C is a schematic circuit diagram of the semi non-magnetic core buck transformer assembly as shown in FIG. 8A.

FIG. 8A is a semi non-magnetic core buck transformer assembly 800 according to another embodiment of the present disclosure. In addition to having windings 410 and windings entrance and exit points 430 and 440, semi non-magnetic core buck transformer assembly 800 of FIG. 8A includes second windings 810, second windings start point 820, and second windings 810 entrance and exit points 830 and 840, respectively. In the embodiment shown in FIG. 8A, second windings 810 are of the same gauge wire as windings 410. FIG. 8B is a top view of semi non-magnetic core buck transformer assembly 800 as shown in FIG. 8A. FIG. 8C is a schematic circuit diagram of semi non-magnetic core buck transformer assembly 800 as shown in FIG. 8A. In FIG. 8C, the voltage between line 430 and line 840, both referenced to line 440 provides a slight reduction of voltage, for example 127 V to 110 V. This embodiment comprises windings 410 wound around semi non-magnetic bobbin 300 (not shown), and second windings 810 wound around part of windings 410. Because windings 410, 810 do not have iron cores, the embodiment utilizes windings 410, 810 that are loosely coupled. As noted above, loosely coupled circuits cannot be characterized by turns ratios; rather, they are characterized by self- and mutual-inductances. Although schematically shown as the same in FIGS. 8A-8C, the wire gauge can differ between windings 410 and second windings 810. Due to the special connections core buck transformer of FIGS. 8A-8C, only a slight reduction in voltage will be attained. It will be appreciated by a person skilled in the art that in order to make semi non-magnetic core buck transformer assembly 800 there are mutual voltages, coefficient of coupling, inductors with mutual coupling and other technical aspects to be considered, and that the start of the windings may be placed on either one of the both inductor's two ends, resulting in various configurations to achieve different polarities and coupling effects.

Figure 9A:
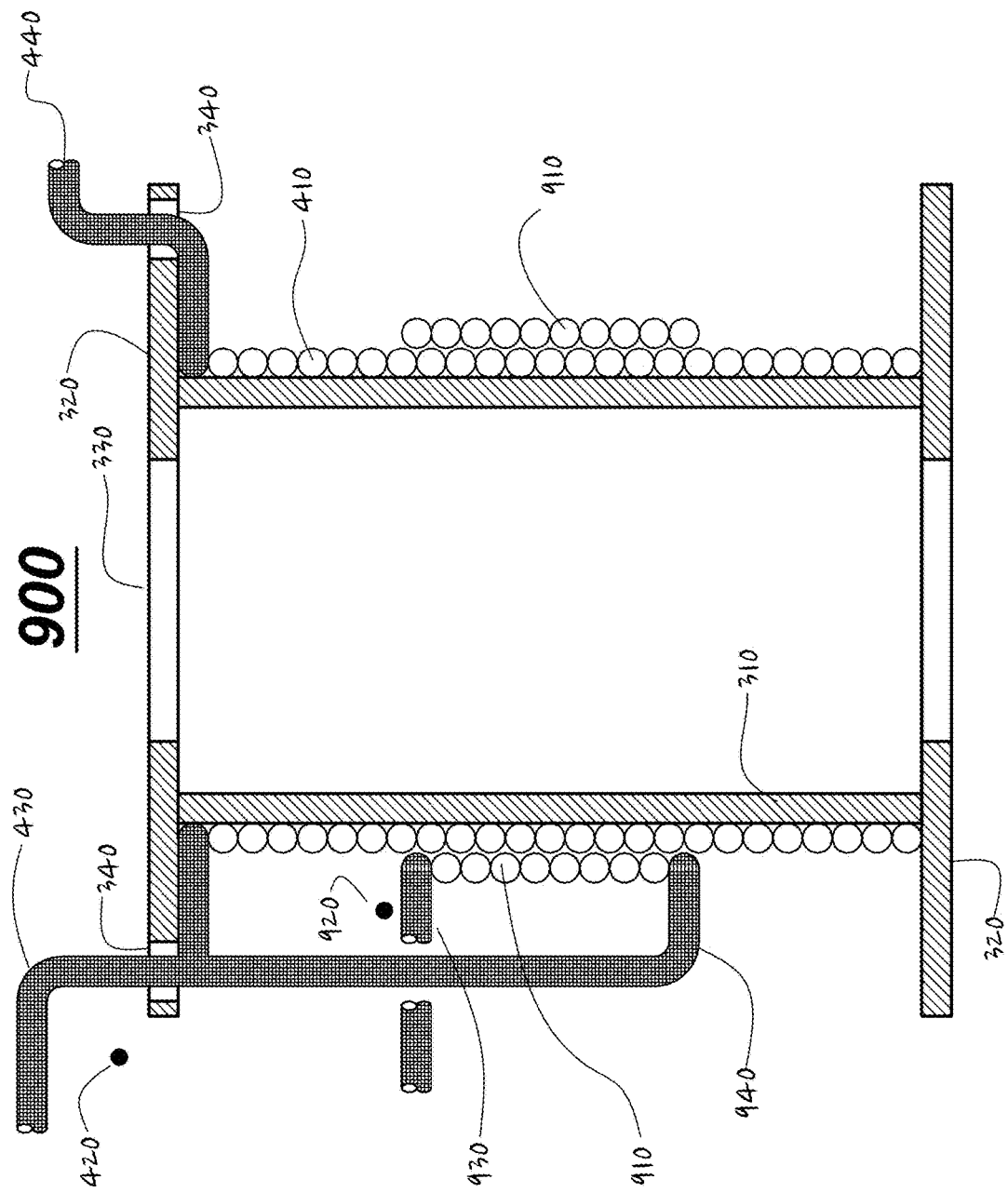
FIG. 9A is a cross-sectional view of a semi non-magnetic core boosting transformer assembly according to another embodiment of the present disclosure.
Figure 9B:
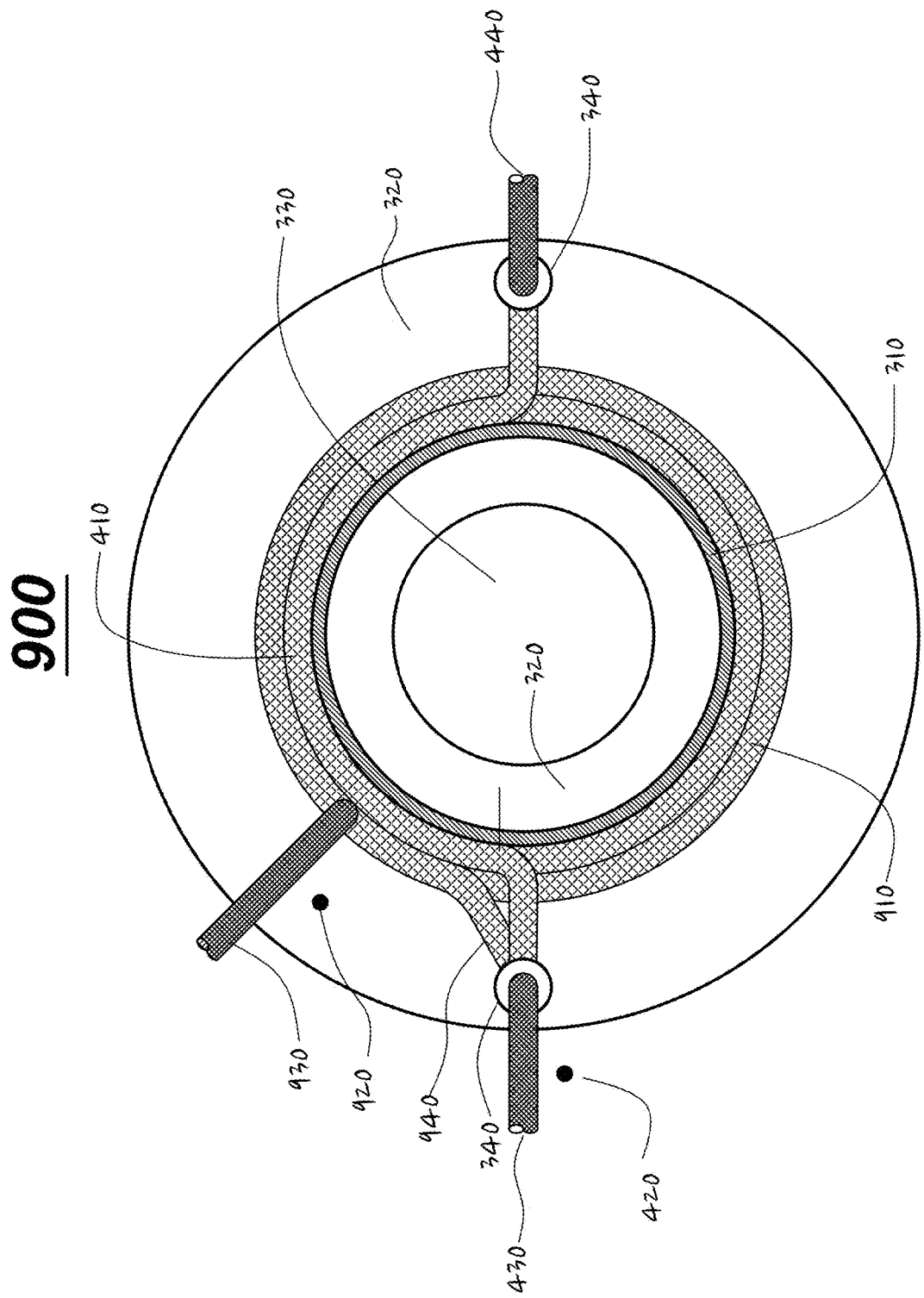
FIG. 9B is a top view of the semi non-magnetic core boosting transformer assembly as shown in FIG. 9A.
Figure 9C:
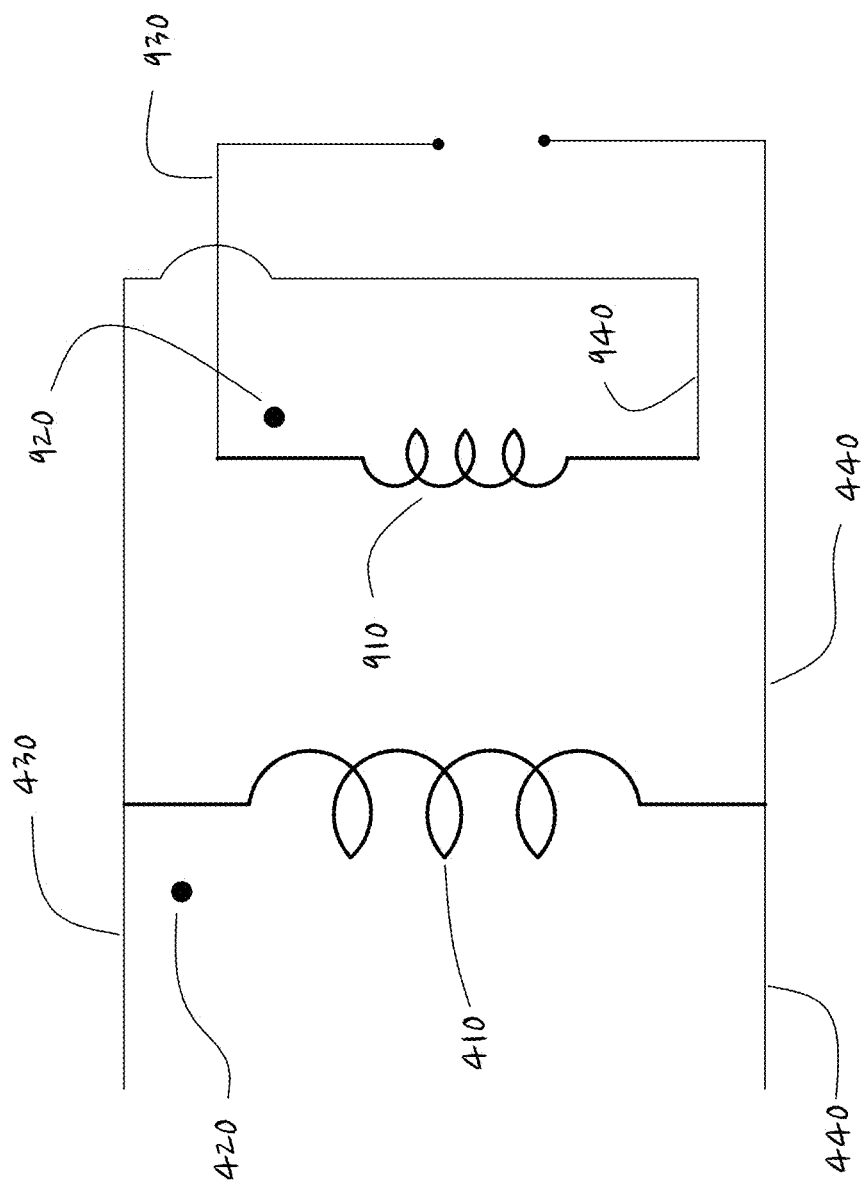
FIG. 9C is a schematic circuit diagram of the semi non-magnetic core boosting transformer assembly as shown in FIG. 9A.

FIG. 9A is a semi non-magnetic core boosting transformer assembly 900 according to another embodiment of the present disclosure. In addition to having windings 410 and windings entrance and exit points 430 and 440, semi non-magnetic core boosting transformer assembly 900 of FIG. 9A includes second windings 910, second windings start point 920, and second windings 910 entrance and exit points 930 and 940, respectively. In the embodiment shown in FIG. 9A, second windings 910 are of the same gauge wire as windings 410. FIG. 9B is a top view of semi non-magnetic core boosting transformer assembly 900 as shown in FIG. 9A. FIG. 9C is a schematic circuit diagram of semi non-magnetic core boosting transformer assembly 900 as shown in FIG. 9A. In FIG. 9C, the voltage between line 930 and line 440, both referenced to line 440, provides a boost of voltage for example 208 V to 220 V. This embodiment comprises windings 410 wound around semi non-magnetic bobbin 300 (not shown), and second windings 910 wound around part of windings 410. Because windings 410, 910 do not have iron cores, the embodiment utilizes windings 410, 910 that are loosely coupled. As noted above, loosely coupled circuits cannot be characterized by turn ratios; rather, they are characterized by self- and mutual-inductances. Although schematically shown as the same in FIGS. 9A-9C, the wire gauge can differ between windings 410 and second windings 910. Due to the special connections shown in FIGS. 9A-B, a boost in voltage is attained. It will be appreciated by a person skilled in the art that in order to make semi non-magnetic core boosting transformer assembly 900 there are mutual voltages, coefficient of coupling, inductors with mutual coupling and other technical aspects to be considered, and that the start of the windings may be placed on either one of the both inductor's two ends, resulting in various configurations to achieve different polarities and coupling effects.

Semi non-magnetic core buck or boosting transformer assembly 800, 900 can be designed to: (a) any input or output voltage and current-carrying capacity by selecting the appropriate conductor ampacity size wire by using any standardized wire gauge system (i.e., American wire gauge (AWG)); (b) any inductance value by measuring the inductor value by any accepted measuring system; (c) any length core size to meet the previous electric values; (d) any numbers of turns; (e) any frequency of operation; and (f) proper windings along the length core to make two or more mutually coupled windings. Any electric and/or industrial technology that uses semi non-magnetic bobbins 300 acting as the core of semi non-magnetic core buck or boosting transformer assembly 800, 900 can deal with high electric flowing currents and high temperatures generated by these flowing currents avoiding eddy current effects due to the use of a non-metallic core that it is not magnetic.

Buck and boosting transformers are used in applications requiring a slight reduction or boost in voltage to a load. For example, in a low-pass broadband filter a buck transformer is used to down the voltage at the filter line reactor output to a level where the voltage at the filter capacitor is acceptable. Also, by way of example, boosting transformers are used for boosting 208V to 230V or 240V, and buck transformers for the opposite, i.e., reducing the voltage, for commercial and industrial air conditioning systems. Boosting transformers are used for boosting 110V to 120V and 240V to 277V for lighting systems. Both buck transformers and boosting transformers are used for voltage correction for heating systems and induction motors of all types. Many applications exist where supply voltages are constantly above or below normal, calling into need the use of a buck or boosting transformer.

Those of skill in the art know that harmonics currents created at non-linear loads flow from the load back onto the utility power grid; thus, the external electrical distribution system cables concentrate the total harmonics currents created by all local zone end users at their different facilities. The prior art system described in relation to FIG. 2 have been used to prevent harmonics currents from propagating to end user facilities. However, those prior art systems present the shortcomings mentioned above, such as not harnessing the power lost by the non-propagated harmonics currents.

Another embodiment of the present disclosure is a new technology system that efficiently captures large harmonics currents that flow in the utility power grid cables and eliminates effectively harmful current harmonics produced at the end user facilities. Moreover, the captured harmonics currents are simultaneously used to positively impact the local total energy consumption that it is registered by an electronic demand meter, thus creating a true electrical power quality and savings system that can lower considerably the cost paid for the electric energy consumed by the end-user.

Figure 10:
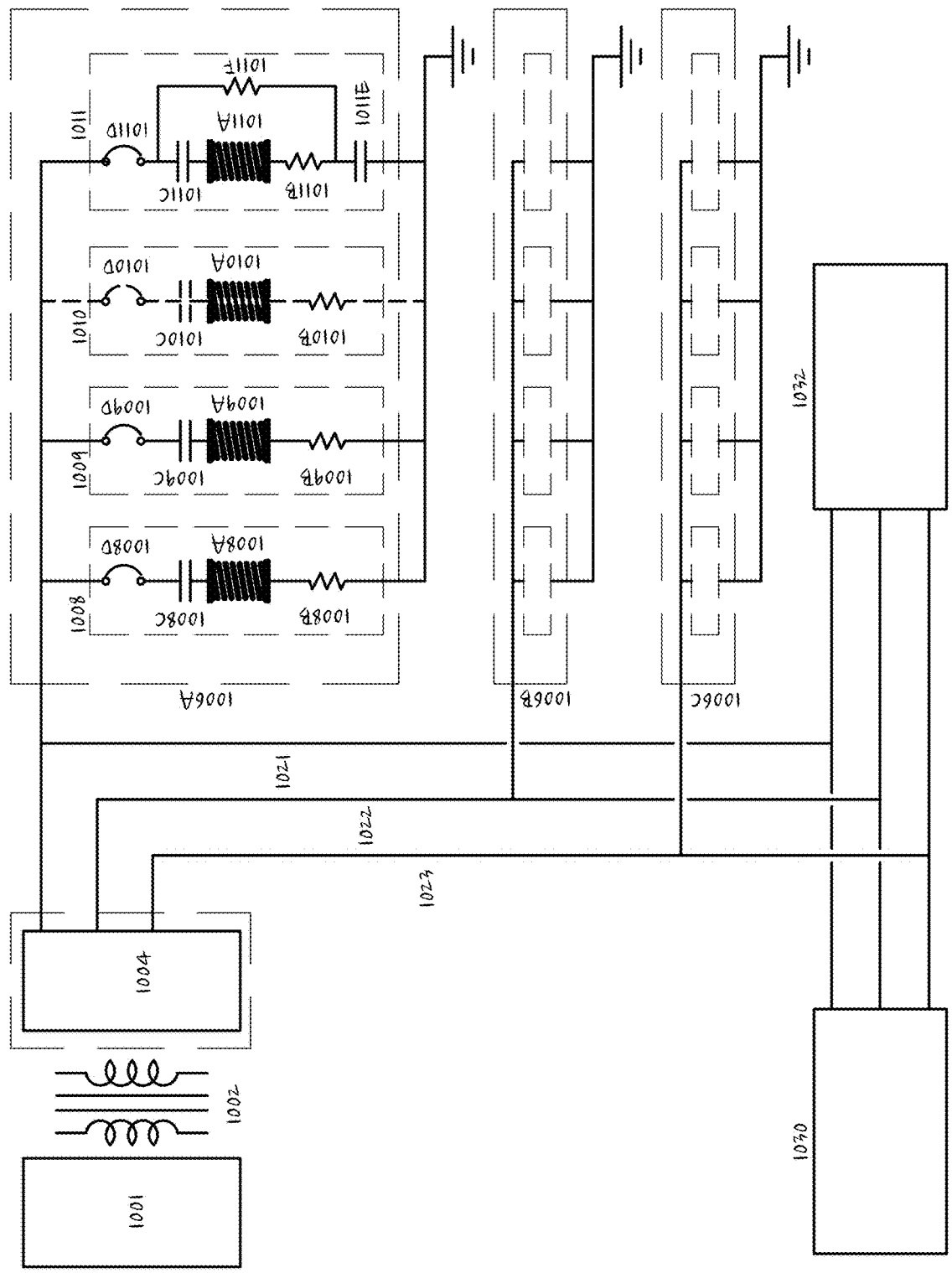
FIG. 10 is an electrical schematic of an embodiment of a passive harmonics filter device for three electrical phases that uses semi non-magnetic core line reactors according to the present disclosure.

FIG. 10 is an overall view schematic diagram of the electrical power quality and saving system of the embodiment of the present disclosure described above.

The exemplary embodiment of FIG. 10 is designed to overcome typical technical problems associated with state-of-the-art ordinary tuned harmonics filters that were described in conjunction with FIG. 2 above. The exemplary embodiment in FIG. 10 involves placing semi non-magnetic core line reactor assembly 400 according to the embodiment described in conjunction with FIGS. 4-4D in each resonant L-C filter.

FIG. 10 shows a three-phase AC utility power grid system 1001, connected directly to a three-phase distribution step-down transformer 1002 that provides a set of three-phase conductors 1021, 1022, and 1023 that are energized by alternating current having a fundamental frequency (e.g., 50 or 60 Hertz). Connected directly to each phase of the three-phase conductors 1021, 1022 and 1023 there is shown a watt-hour and demand electric meter 1004, at least one harmonics current producing load 1030, at least one linear load 1032, and passive harmonics filters 1006A, 1006B, and 1006C, respectively. If the at least one linear load 1032 needs power factor correction, then an individual power factor capacitor bank may be located at each one. A possible resonance effect will be less severe when power factor capacitors are located out on the plant floor on motors and in motor control centers and out of the main power bus. This assumes that power cables are sufficiently long to introduce enough resistant into the electric circuit to dampen the resonance.

Passive harmonics filters 1006A, 1006B, and 1006C are shown connected between the set of three-phase conductors 1021, 1022, and 1023, respectively, and to ground. Referring particularly to passive harmonics filter 1006A, there is shown a series of resonant LC filters 1008, 1009 and 1010 each of them tuned specifically to capture and filter selected undesirable harmonics currents flowing at phase 1021. Resonant LC filter 1008 may be specifically designed to filter out third harmonics current, resonant LC filter 1009 may be specifically designed to filter out fifth harmonics current, and resonant LC filter 1010, could indicate any number of individual resonant LC filters needed to filter out major harmonics frequencies such as the $7^{th}$, $9^{th}$, $11^{th}$, $13^{th}$, and so on according to the needs of a particular system. Also shown in FIG. 10 is a well-known high-pass filter 1011 which is designed to filter out any harmonics current frequency above the selected undesirable harmonics currents filtered by the resonant LC filters that are present, according to the needs of a particular system.

Referring to the resonant LC filter 1008 (which is similarly designed as resonant LC filter 1009 and 1010, so that the following description relates to resonant LC filter 1009 and 1010 as well) and in accordance with the present embodiment, the resonant LC filter 1008 also includes a thermomagnetic contactor 1008D in series with a capacitor 1008C. Also, capacitor 1008C is in series with semi non-magnetic core line reactor assembly 400 according to the embodiment described in conjunction with FIGS. 4-4D, designated as element 1008A in FIG. 10. The resistor shown at 1008B represents the DC resistance of semi non-magnetic core line reactor 1008A and is made as small as possible in the construction of semi non-magnetic core line reactor 1008A in order to maximize the "Q" factor of resonant LC filter 1008. Thermomagnetic contactor 1008D's, capacitor 1008C's and semi non-magnetic core line reactor 1008A's respective values and ampacity capability are selected according to a particular harmonics current that has to be filtered. Thermomagnetic contactor 1008D is used for current-limiting in case the calculated maximum current capability is exceeded by extraordinary overcurrent events.

Referring to resonant LC filters 1008, 1009 and 1010 in accordance with the exemplary embodiment of FIG. 10, may comprises any number of individual resonant LC filters needed to filter out major harmonics frequencies such as the $7^{th}$, $9^{th}$, $11^{th}$, $13^{th}$ and so on according to the needs of a particular system.

Referring to the high-pass filter 1011, and in accordance with the exemplary embodiment shown in FIG. 10, high-pass filter 1011 comprises a thermomagnetic contactor 1011D in series with a resistor 1011F and a capacitor 1011E, and resistor 1011F is also in parallel with a combination of: a capacitor 1011C in series with semi non-magnetic core line reactor 1011A and a resistor 1011B. Resistor 1011B represents the DC resistance of semi non-magnetic core line reactor 1011A and is made as small as possible in the construction of semi non-magnetic core line reactor 1011A in order to maximize the "Q" factor of high-pass filter 1011. The entire foregoing electronic configuration is in series with capacitor 1011E. Thermomagnetic contactor 1011D, capacitors 1011C and 1011E, semi non-magnetic core line reactor 1011A, and resistor 1011F have respective values and ampacity capability selected according to a particular harmonics current that has to be filtered. Thermomagnetic contactor 1011D is used for current-limiting in case the calculated maximum current capability has been exceeded by extraordinary overcurrent events.

It will be appreciated that the remaining passive harmonics filters 1006B and 1006C are made with the same specifications, components and features as passive harmonics filter 1006A. The only difference is that passive harmonics filters 1006B and 1006C are connected to conductors 1022 and 1023, respectively.

The exemplary embodiment of FIG. 10 that uses semi non-magnetic core line reactor assembly 400 according to the embodiment described in conjunction with FIGS. 4-4D made with the semi non-magnetic bobbins 300 has a very low impedance and high-quality factor "Q" at the selected and tuned frequency or band of frequencies in order to capture most of the harmonics currents at the frequency or band of frequencies selected. Thus, the exemplary embodiment of FIG. 10 acts as an efficient shunt path for the total harmonics currents flowing at the utility local cluster power zone where the end user's facility is located and, at the same time, crates an efficient shunt path for the generated harmonics currents, if any, at the end user local facility. Without the exemplary embodiment of FIG. 10 these harmonics currents would otherwise flow freely along the utility electrical distribution power grid system.

By capturing the selected harmonics, the exemplary embodiment of FIG. 10 captures and mathematically adds currents that have different current flow direction (different electrical sign). The added harmonics currents are generated inner harmonics currents Ih1021, Ih1022 and Ih1023 for each of conductors 1021, 1022 and 1023, respectively, to the external imported harmonics currents IH1021, IH1022, IH1023 for each of conductors 1021, 1022 and 1023, respectively, yielding total harmonics currents IHT1021, IHT1022 and IHT1023, respectively, that are driven to an electrical ground. This, therefore, automatically cancels and impedes any generated inner harmonics currents that could be injected into the external system power grid 1001. It is important to note at this point that the imported external harmonics currents IH1021, IH1022 and IH1023 have already been measured and registered by a utility watt-hour and demand electronic meter to each of the respective end users that generated them. Thus, the exemplified embodiment system "imports" otherwise electrical waste that has already been accounted for and charged to the respective end user that generates it.

Electric utility companies charge to the industrial end user energy consumption in two electrical quantities, the total cumulative energy consumed (kilowatt-hour) and the maximum demanded power used for a given period (kilowatts). Modern industrial electronic watt-hour and demand energy meters 1004 are based on computer precision time-division and digital sampling, giving accurate measurements of the fundamental currents and harmonics currents injected onto the utility's power system 1001.

Captured and added external harmonics currents and internal harmonics currents, if any, by this embodiment impact positively the local energy consumption that it is properly registered by an electronic watt-hour and demand meter 1004. The result of the sum of internal generated harmonics currents Ih1021, Ih1022 and Ih2023, if any, and imported external harmonics currents IH1021, IH1022 and IH1023 modify the electrical current sinusoidal wave shape to be sampled by the electronic watt-hour and demand meter 1004, lowering both the total cumulative energy consumption (kilowatt-hour) and especially the maximum demanded power for a given period (kilowatts). It is important to mention that electronic watt-hour and demand meters 1004 measure and sample accurately the real electrical current sinusoidal wave shape at any time and most important account accurately the harmonics injected back onto the utility power grid 1001. In this manner, the total harmonics currents injected to the utility power grid 1001 are mathematically negative (extracting harmonics currents) for the selected harmonics currents to be suppressed.

The passive harmonics filter of the exemplary embodiment of FIG. 10 can be used at any time regardless of the existence of harmonics currents generated by the end user facility. The end user is doing the job of eliminating harmonics currents waste that sooner or later the utility company must do. As mentioned above, the exemplary embodiment of FIG. 10 is very effective in importing harmonics currents only from the utility cluster power zone where the end user's facility is located. If more than one exemplary embodiment is installed at the same cluster power zone, the imported harmonics currents would be divided equally by the number of exemplary embodiments installed.

If this technology is deployed with a carefully studied and planned energy saving program in different utility's cluster electric power zones, the utility company will deal with a minimal total harmonics currents suppression at its main plant load, thus lowering the need to buy costly and gigantic harmonics filters, lowering the requirement for increased ampacity (capability of conductors to carry current) of conductors, decrease of overheating of transformers, reduce high neutral currents in grounded three phase or four wire systems and increase dramatically the life of the power distribution systems and their accessories in general. As explained above, if the exemplary embodiment of FIG. 10 is deployed extensively and properly, it will help in limiting voltage distortion levels on the overall utility system. In general, end user injected harmonics currents will flow toward the utility supply source through the system's impedance, generating voltage distortion. By eliminating end-user's injected harmonics currents, the voltage distortion can be lowered significantly. This method will be in accordance with the proposed basic method of controlling the overall distortion levels proposed by IEEE Standard 519-1992. Thus, the embodiment improves the end user total electric power system performance by drastically reducing the line side current harmonics currents generated by non-linear loads and creates a real end user energy saving program.

Figure 11B:
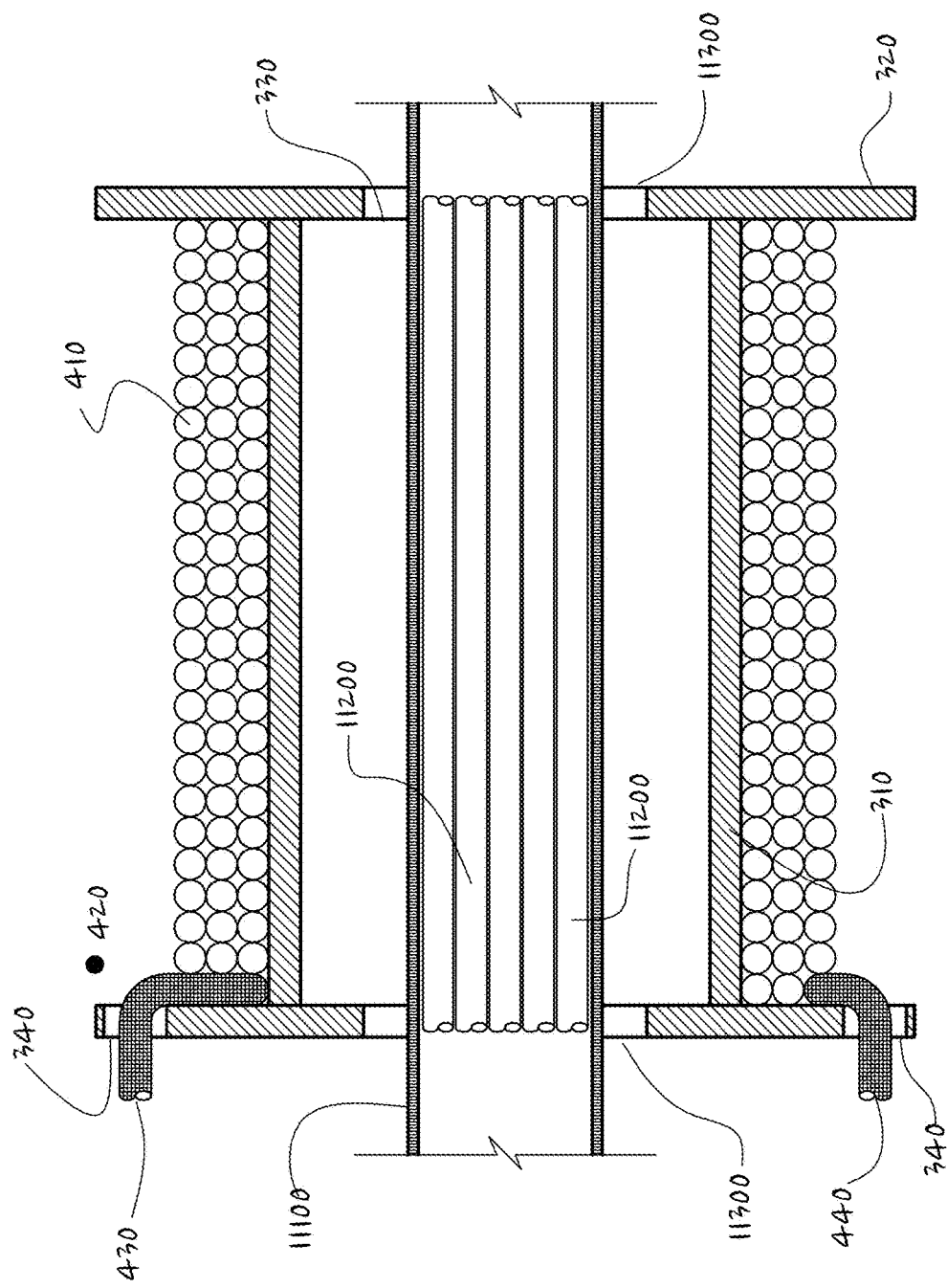
FIG. 11B is a side cross-sectional view of a semi non-magnetic core line reactor assembly as shown in FIG. 11A.
Figure 11C:
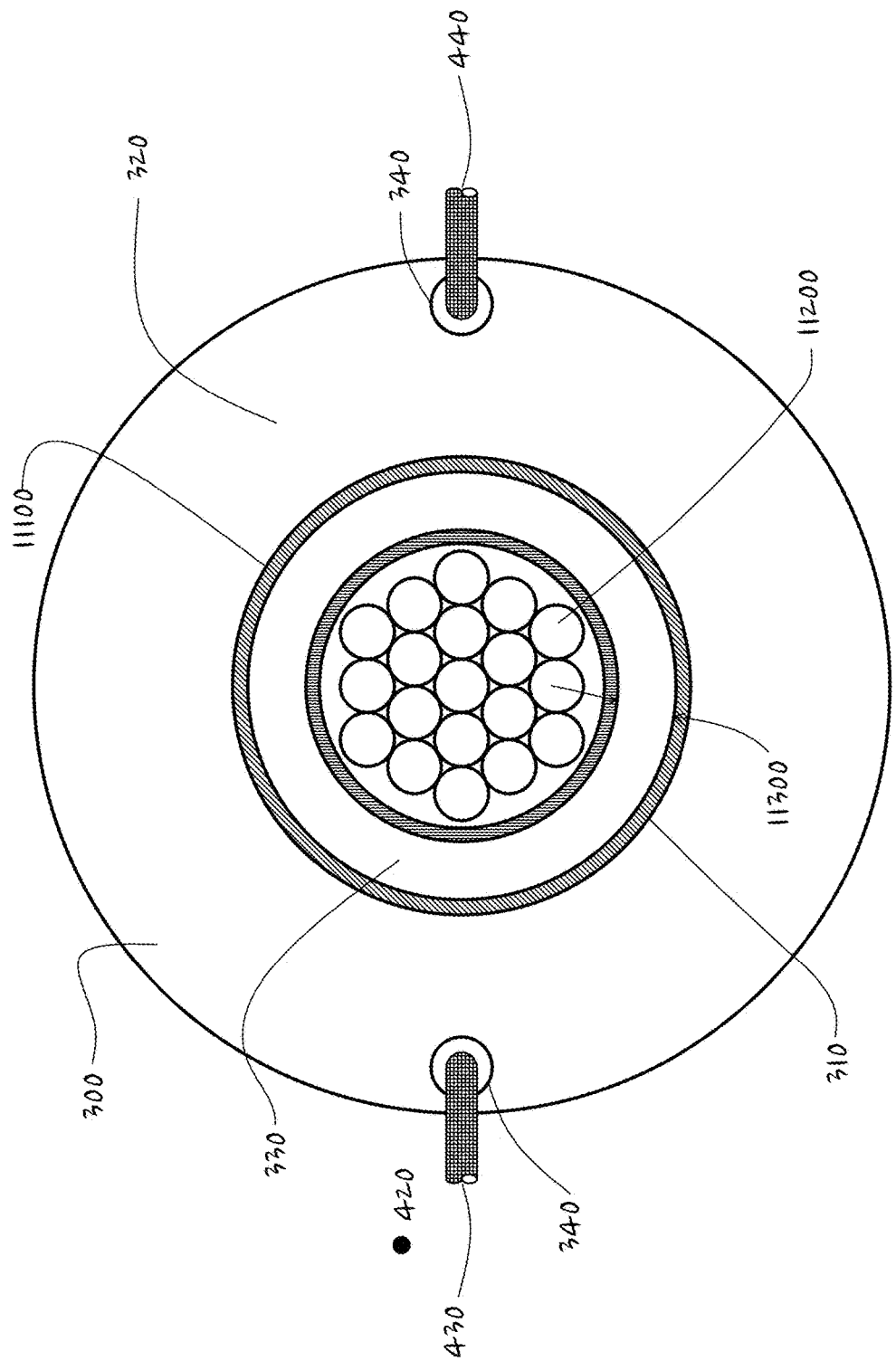
FIG. 11C is top a cross-sectional view of a semi non-magnetic core line reactor assembly as shown in FIG. 11A.

FIG. 11A is a semi non-magnetic core line reactor assembly 11000 according to the present disclosure, and FIGS. 11B and 11C show side and top cross-sectional views, respectively, of the semi non-magnetic core line reactor assembly as shown in FIG. 11A. The embodiment shown in FIG. 11A has a semi non-magnetic bobbin 300, windings 410 that are wound around the semi non-magnetic bobbin 300 to create a semi non-magnetic core reactor (see, FIGS. 4-4D) and a magnetic metallic pipe 11100 that is inserted and centered through center hole 330 of semi non-magnetic bobbin 300, creating an air gap 11300 between center hole 330 and magnetic metallic pipe 11100. Magnetic metallic pipe 11100 has an internal structure of pipes 11200 made of the same magnetic metallic material as magnetic metallic pipe 11100 to create a fluid turbulence and continuous physical contact between a circulating fluid surrounding the internal structure of pipes 11200 when the circulating fluid is pumped through magnetic metallic pipe 11100.

As mentioned earlier, any electric and or industrial technology that uses the semi non-magnetic bobbin 300 as part of semi non-magnetic core line reactor assembly 11000 can handle high electric currents, avoid high temperatures generated by these flowing currents, and also avoid eddy current effects at the semi non-magnetic bobbin 300 due to the use of a non-metallic core that it is not magnetic. Semi non-magnetic core line reactor assembly 11000 core line reactor of FIGS. 11A-C can be used as a tuning reactor element in any multi-section shunt passive filter that is tuned to a specific frequency in order to create a resonant circuit of the harmonics current. As such, the reactor element can capture most of the harmonics currents from the electrical power system at the frequency or band of frequencies selected.

The semi non-magnetic bobbin 300 can induce eddy current effect to the separation between magnetic metallic pipe 11100 and internal structure of pipes 11200 creating a very high temperature in all of them. Thus, the circulating fluid can be heated effectively. Because of the existence of air gap 11300, the very high temperature generated is minimally transferred to semi non-magnetic bobbin 300 so it conserves all the electrical benefits mentioned above with a continuous working cycle of heating the circulating fluid.

Figure 12:
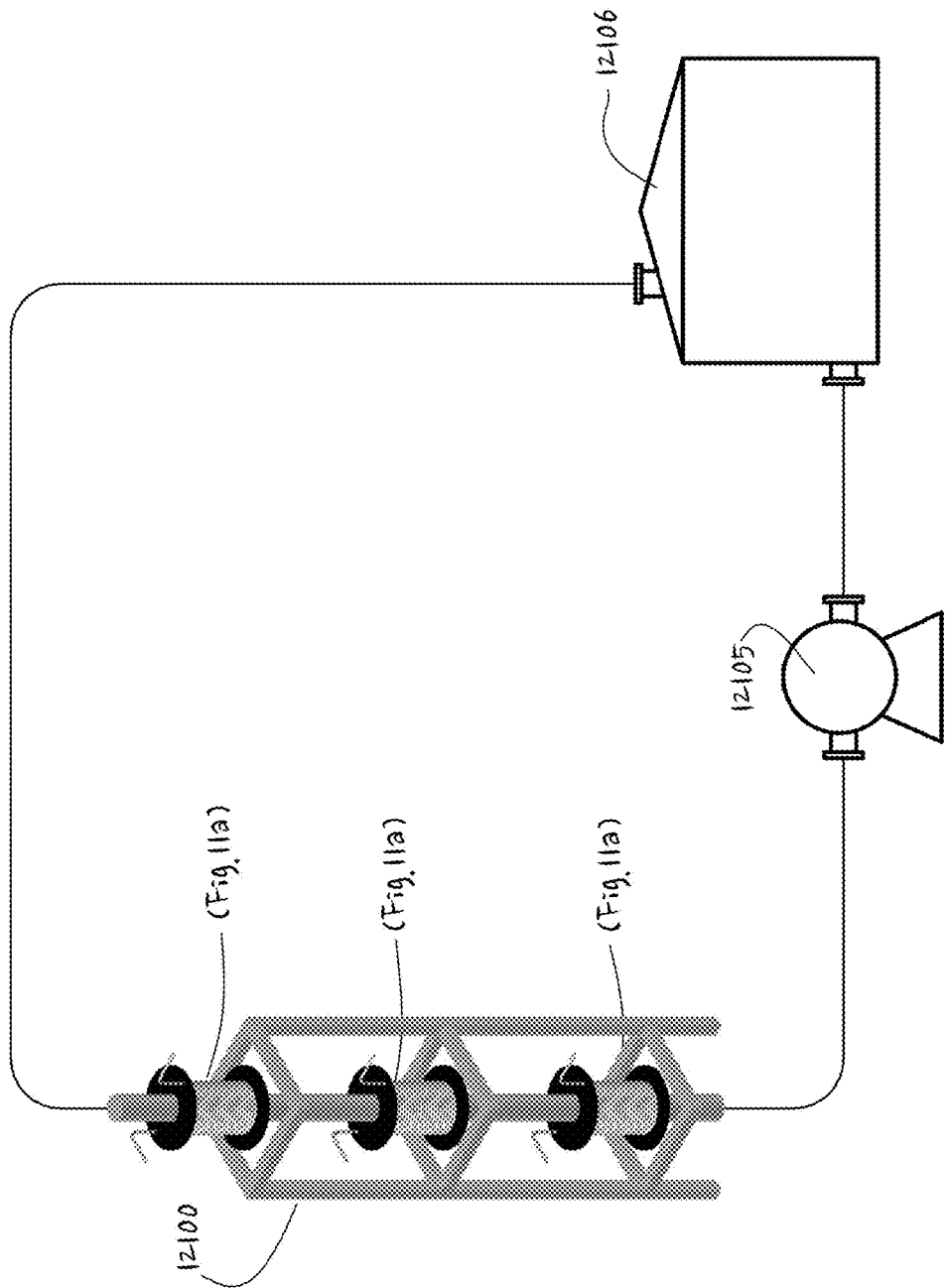
FIG. 12 is a fluid heating system using the semi non-magnetic core line reactor assembly according to FIG. 11A.

FIG. 12 is a complete fluid heating system 12000 using a plurality of semi non-magnetic core line reactor assemblies 11000. FIG. 12 shows a closed loop fluid heating system using a plurality of semi non-magnetic core line reactor assemblies 11000 stacked in a rack configuration in an aluminum rack structure 12100 to avoid eddy current induction to aluminum rack structure 12100. The fluid (not shown), acting as heating fluid is pumped with a pump 12105 and the heating fluid is returned to a stainless steel container 12106 to store it. When the heating fluid is needed it is simply taken from stainless steel container 12106 for any application that is desired. An example could be heating water for showers.

Generally, petroleum, coal and/or natural gas, fuel gases such as city gas and propane are burnt as heat sources for generation of steam and heating water in generating stations and factories.

The embodiment shown in FIG. 12 is a 100% pollution-free electromagnetic induction heater using harmonics currents imported from the electrical power system as its working source and with a zero-cost heating process.

While the embodiments are susceptible to various modifications and alternative forms, specific embodiments thereof have been shown by way of example in the drawings and are herein described in detail. It should be understood, however, that the description herein of specific embodiments is not intended to limit the disclosure to the particular forms disclosed but, on the contrary, the intention is to cover all modifications, equivalents, and alternatives falling within the scope of the disclosure as defined by the appended claims. Some embodiments of the present disclosure provide a filter that is more capable to filter inner and outer harmonics currents than the prior art filters. Other embodiments provide a filter that is less expensive and smaller than prior art filters. These and other benefits of one or more embodiments of the present disclosure will be apparent to those of skill in the art based on the foregoing detailed description and Figures of embodiments of the present disclosure.

What is claimed is:

1. A fluid heating system comprising:
 a plurality of core line reactor assemblies, wherein each core line reactor is comprised of:
  a plurality of semi non-magnetic bobbins, wherein each of the plurality of semi non-magnetic bobbins comprises:
   a central section having a length and two ends, wherein the central section comprises a hollow core and has an opening disposed at each end to provide access to the hollow core; and
   a pair of flanges, a separate one of the pair of flanges disposed at a separate end of the central, wherein each flange has an opening sized and configured to coincide with the opening at each end to provide access to the hollow core, wherein each flange has a portion disposed away from the central section, and wherein at least one flange has at least one through-hole disposed in the portion disposed away from the central section; and
  windings of wire around each semi non-magnetic bobbin;
 a pipe passing through the hollow core of each of the core line reactor assemblies, wherein the pipe has a first end and a second end, and wherein the pipe is configured to allow a fluid to pass therethrough; and
 a pump connected to the first end and the second end to form a closed loop, wherein the pump can pump fluid through the pipe passing through the hollow core of each of the plurality of core line reactor assemblies.

2. The fluid heating system according to claim 1, further comprising a rack for stacking the plurality of core line reactor assemblies vertically one above the other.

3. The fluid heating system according to claim 1, further comprising a container to store heated fluid.

* * * * *